(12) United States Patent
Masten, Jr.

(10) Patent No.: US 11,761,055 B2
(45) Date of Patent: *Sep. 19, 2023

(54) METHOD FOR HEATING A METAL CASTING USING INFRARED ENERGY

(71) Applicant: James William Masten, Jr., Everett, WA (US)

(72) Inventor: James William Masten, Jr., Everett, WA (US)

( * ) Notice: Subject to any disclaimer, the term of this patent is extended or adjusted under 35 U.S.C. 154(b) by 285 days.

This patent is subject to a terminal disclaimer.

(21) Appl. No.: 16/984,013

(22) Filed: Aug. 3, 2020

(65) Prior Publication Data

US 2020/0362434 A1    Nov. 19, 2020

Related U.S. Application Data

(63) Continuation of application No. 15/397,744, filed on Jan. 4, 2017, now Pat. No. 10,738,368.

(60) Provisional application No. 62/340,416, filed on May 23, 2016, provisional application No. 62/275,237, filed on Jan. 6, 2016.

(51) Int. Cl.
| | | |
|---|---|---|
| *C21D 11/00* | (2006.01) | |
| *C21D 9/00* | (2006.01) | |
| *C21D 1/34* | (2006.01) | |
| *H05B 1/02* | (2006.01) | |
| *G01N 25/00* | (2006.01) | |

(52) U.S. Cl.
CPC ............... *C21D 11/00* (2013.01); *C21D 1/34* (2013.01); *C21D 9/0062* (2013.01); *G01N 25/00* (2013.01); *H05B 1/0227* (2013.01)

(58) Field of Classification Search
CPC ........ C21D 11/00; C21D 1/34; C21D 9/0062; G01N 25/00; H05B 1/0227
See application file for complete search history.

(56) References Cited

U.S. PATENT DOCUMENTS 3,907,606 A * 9/1975 Chang .................... G01K 1/143
                                                  374/E1.019
5,981,919 A * 11/1999 Masten, Jr. ............. F27D 19/00
                                                  148/698

* cited by examiner

*Primary Examiner* — John A Hevey

(57) ABSTRACT

A metal casting is heated using infrared energy by introducing the metal casting into a heating chamber with infrared emitters directed towards the casting, and activating at least a portion of the emitters. The infrared emitters may have a metal coil that is partially embedded in a refractory material, and be tunable to emit wavelengths from about 2 μm to about 3.3 μm. The infrared wavelength used to heat the metal casting may be selected based on a surface roughness of the casting. Surface roughness can be measured by measuring a roughness of a part cast from the same mold as the heated casting, which can be the casting that is being heated. Heating may be controlled by measuring the temperature of the casting while a shield is deployed that covers the emitters, which prevents radiations from the emitters from affecting the temperature measurement.

20 Claims, 9 Drawing Sheets

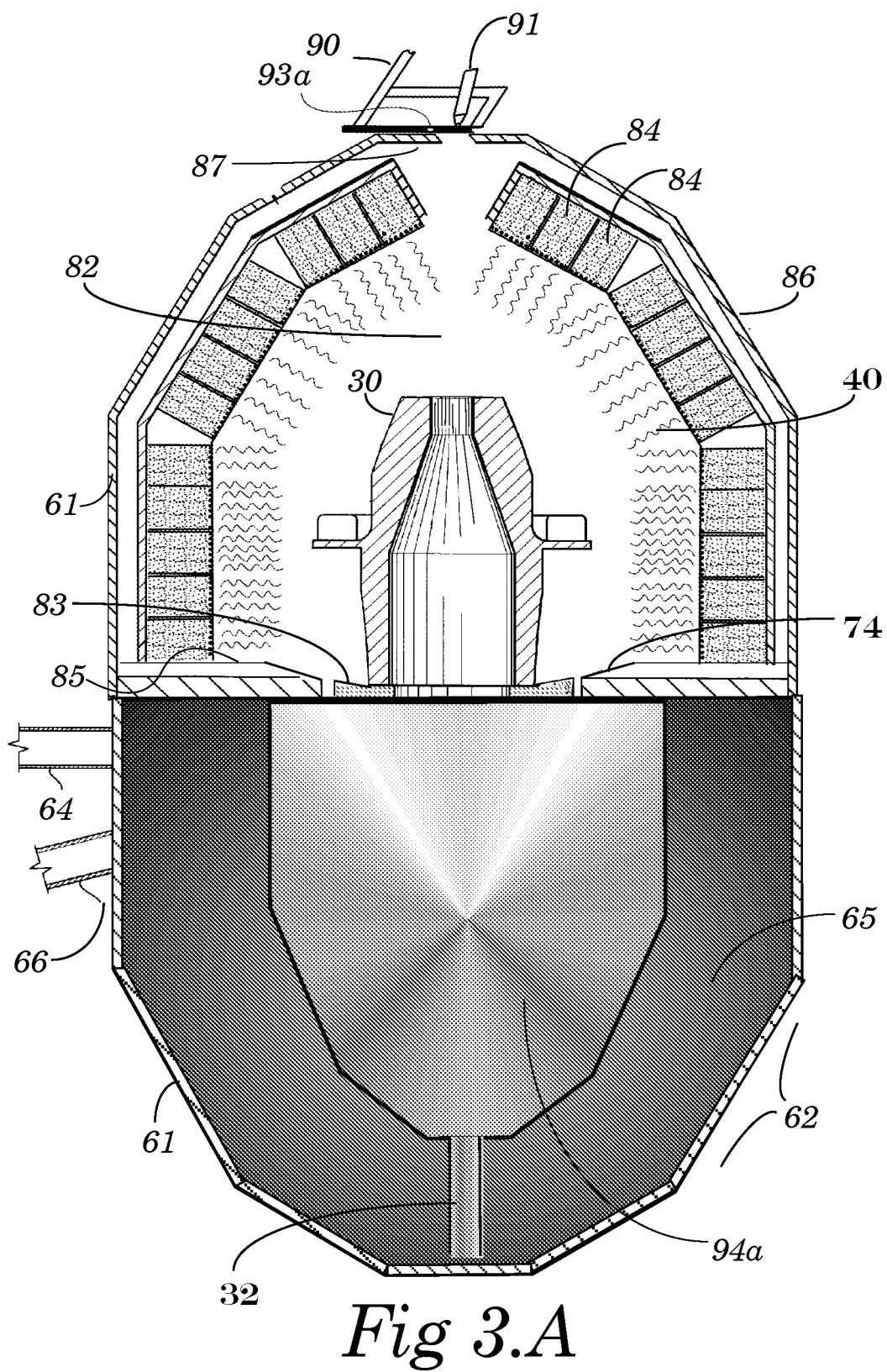
Fig 3.A

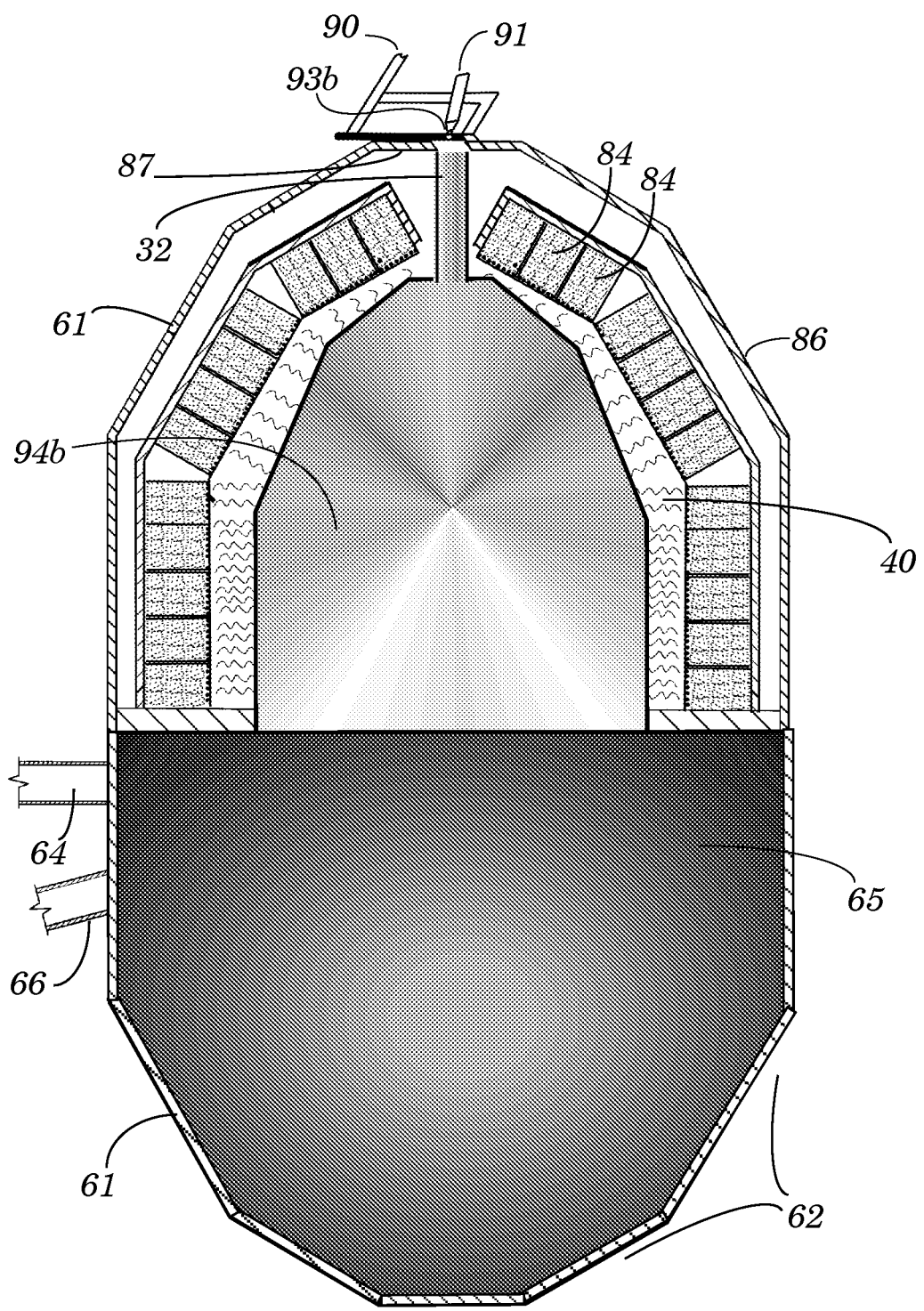
Fig 3.B

METHOD FOR HEATING A METAL CASTING USING INFRARED ENERGY

CROSS REFERENCE TO RELATED APPLICATIONS

The present application is a continuation of and claims priority to U.S. application Ser. No. 15/397,744, filed Jan. 4, 2017, and issued as U.S. Pat. No. 10,738,368, which claims the benefit of U.S. Provisional Application No. 62/340,416, filed May 23, 2016, and U.S. Provisional Application No. 62/275,237, filed Jan. 6, 2016, the contents of which are incorporated herein by reference in their entirety.

BACKGROUND

Liquid casting aluminum is a single phase alloy material to which other elements are added to aluminum to form a solution, i.e., are dissolved in the aluminum. When the casting aluminum alloy is allowed to slowly cool from a melt phase, e.g., standing in open air, the added elements in the aluminum precipitate out of the solution through a process known as nucleation. Nucleation in material allowed to slowly cool is a process in which not many nuclei are formed, but the ones that do form grow rapidly in size and consume the added elements. The result is a bulk article wherein the aluminum is relatively pure metal with isolated, distinct volumes of added elements distributed non-uniformly through the aluminum. This state is undesirable when the aluminum is being used to form structural articles because pure aluminum is gummy to machine and has poor strength properties.

But this is the current state of practice and has been since the development of aluminum casting processes approximately 120 years ago. Typical today is a process whereby a significant number of castings are formed and allowed to cool on the shop floor (losing the heat of the melt to the atmosphere) until a significant quantity are collected and the batches are heated in a convection oven to the "solutionizing" temperature (approximately 1,000° F.) which in theory allows the large nuclei to breakdown and migrate as smaller particles distributed uniformly throughout the parent material. After a sufficient time for migration (typically 2-8 hours at temperature) the castings are dropped into the quench tank and rapidly cooled, locking the added elements in a uniform distribution throughout the parent (e.g., aluminum) material. The goal of this process is to return the precipitate in the solid material to near the solution state of the liquid material that was poured into the mold. This cooling and reheating, given the efficiencies of the convection oven, has an energy cost at a minimum of four times the energy required to form the original melt.

There are many issues with current heat treatment processes even though they are nearly universal in application. The current processes are not accurate with regard to the uniformity of temperature of the batch heating process. Additionally, as the cold castings are typically stacked one upon another prior to submission to the heat treatment oven, there is the potential for damage, and as the large stack of hot castings is inserted into the quench tank, the temperature of the quench tank changes significantly from the first casting inserted to the last one. The existing processes are expensive in terms of both time and energy, in that the heat treatment cost is a major component of the total production cost.

Typically the quenched casting is allowed to age naturally or it is submitted to an artificial aging process where the castings are inserted in a fixed temperature convection heating oven for a period of time. Artificial aging is desirable because it saves time and allows the parts to move to machining sooner. But the convection heating of the cold casting to the artificial aging temperature requires significant additional energy and time.

The current process including casting, heat treatment and aging process can take a minimum of a week and in most foundries a typical process flow will require more than three weeks to move from pour through machining with most of those three weeks involving heat treatment and artificial aging.

Most significantly, when this inventor began this study and research effort nearly 18 years ago, there was little interest in the energy lost to the conventional heat treatment, quench and artificial aging processes. But with current sensitivities to energy waste the opportunity to save as much as 90% of the energy of the process is now of keen interest.

If aluminum with added elements is rapidly cooled (quenched) while still hot and in a solutionized state, the added elements do not have the opportunity to form large nuclei, but will form many uniformly distributed smaller nuclei as the metals solidify. If the aluminum and added elements have been allowed to slowly cool to a solid, it is still possible to add enough thermal energy to force the added elements to dissolve in the aluminum (solutionize) without actually melting the aluminum. The advantage this offers is that the aluminum can be cast into shape, cooled in air until sometime later, and then re-solutionized and quenched. The more uniform distribution of many nuclei dramatically increases the strength of the alloy over pure aluminum or alloys that cool too slowly and form far fewer and much larger nuclei.

The aluminum alloy casting can be developed to further improve its mechanical strengths by growing the size of the many uniformly distributed nuclei through a process of precipitation heat treating or precipitation hardening typically referred to as "aging." During "aging," the nuclei grow larger in size as a diffusion process that progresses more rapidly at elevated temperatures. But, if the temperatures are elevated too high, upon cooling the nuclei will collapse together and form fewer large nuclei similar to that found in aluminum that has been slowly cooled, e.g., without solutionizing, as described above. Ideally, precipitation strengthening of supersaturated solid solutions involves the formation of finely dispersed precipitates during aging heat treatment (which may include either natural aging or artificial aging). The aging may be accomplished not only below the equilibrium solvus temperature, but below a metastable miscibility gap called the Guinier-Preston (GP) zone solvus line. The GP zone solvus line is the temperature for a particular mix of parent metal and added elements above which the magnitude of super-saturation decreases the probability of stable clusters being formed. The eutectic mix is not in equilibrium, but at elevated temperatures above the GP zone solvus line, the extremely fine-grain molecular foundations upon which the precipitates will grow and harden the physical properties, become unstable and do not support precipitation growth or, at higher temperatures, even dissolve.

The aluminum casting industry uses heat treating as a mechanism to increase the strength of the aluminum castings. The process usually amounts to the addition of sufficient thermal energy to force all of the elements that have been added to the aluminum into a solid solution (solutionizing). Energy is consumed as these added elements are dissolved in the aluminum solid. The amount of energy required to achieve the necessary diffusion is significant.

Conventional methods for producing cast aluminum alloy products include initially pouring a suitable molten aluminum alloy into a mold. After the molten alloy has sufficiently solidified, the casting is removed, and is set aside to cool in the open air. Normally, a few days' worth of production is collected for a batch solutionizing process. Alternatively, the removed casting could be immediately subjected to a solution heat treatment without cooling first.

A conventional method for solution heat treating a cast part involves placing many cast parts in a large forced air convection oven. In the convection oven, the castings are subjected to circulated air or some non-reactive gas which has been heated to the desired "solution" temperature (approximately 1,000° F.). Typically, the process is procedural and the castings are held for what is deemed a sufficient amount of time for them to "process", usually at least 2-8 hours. Following the solution heating phase, the cast part is immediately quenched in water to rapidly cool the product. Following this cooling, the part is naturally or artificially aged.

One of the drawbacks of the convection solution heat treatment processes, such as that described above, is the length of time required to complete the treatment. Typically, large numbers of cast aluminum parts are solution heat treated at once in a batch process. Since it is difficult to maintain even and uniform temperatures in all of the parts, in order to ensure that all the parts are properly heated, the exposure time to the hot convection gases is usually at least two hours and often more than eight hours. The length of time required for the solution heat treatment contributes significantly to the time required to manufacture cast parts. Furthermore the stacking of the parts may seriously interfere with the ideal convection air flow resulting in a non-uniform heating profile between parts heated in the same batch.

It has been proposed that infrared heat treatment systems may improve the operational efficiency of the casting process by replacing convection air driven solution heat system and reducing cycle times. For example, U.S. Pat. No. 5,306,359 describes a method for heat treating an aluminum part by applying infrared radiation directly from a source of infrared energy to the part until the part attains a desired state of heating. According to the '359 patent, during the heat treating, the temperature of the part is monitored and the intensity of the radiation source is proportionally controlled in response to the monitored temperature. The temperature of the part in the '359 patent is described as being monitored by a plurality of optical pyrometers 80, 82 and 89, illustrated as being directed towards an irradiated surface of the part.

The '359 patent stated that the use of optical pyrometers to measure the temperature of the aluminum cast parts is complicated by the reflectivity of aluminum and the uncontrolled radiant energy from the background (i.e., the temperature of the lamps, and refractive surfaces). Reportedly, the reflectivity of the aluminum and the radiant energy of the background cooperate to create a temperature readout from the optical pyrometers that is not representative of the temperature of the surface of the part being observed by the optical pyrometers. In an effort to account for these inaccuracies and provide a more accurate reading of the temperature of the part, the '359 patent describes the taking of measurements from a background optical pyrometer, then making adjustments to the readout from the part optical pyrometer based on the readout from the background optical pyrometer.

U.S. Pat. No. 5,336,344 describes a method and apparatus for producing a cast aluminum part using a high intensity electric infrared heating system to heat the part. The described system is similar to the system described in U.S. Pat. No. 5,306,359 noted above. The '344 patent broadly describes that each infrared heating station includes a means for monitoring the actual temperature of the casting, and that the heating of the casting at each station is controlled in accordance with this monitored temperature. Like the '359 patent, the '344 patent describes that optical pyrometers 46 can be used to generate a signal representative of the casting temperature. The '344 patent describes that this signal can be used to control the heating of the parts. In the illustrations, the optical pyrometers are shown as being directed at a surface of the part that is irradiated.

U.S. Pat. No. 5,340,418, by the same inventor of the '344 patent, proposes additional control methods to control the amount and application rate of infrared energy applied to the part during the solution heat treating process. These proposed methods rely upon the same optical pyrometers described in the '344 patent for assessing the part temperature. In one embodiment, the optical pyrometers are used to monitor the temperature of the part. This temperature is compared to a predetermined solution heat treatment temperature which is chosen as a function of the particular material used to cast the part. As long as the temperature of the casting as measured is less than the predetermined solution heat treatment temperature, the heating is continued at the initial predetermined level provided by the infrared energy source.

In each of the processes described in the three patents noted above, the cast aluminum part is indexed through a plurality of individual stations while the part is rotated relative to the path of travel. By indexing the part through the stations, the part resides in each station for a predetermined period of time before it is transported to the next station.

Industry expectations for each of the processes and apparatuses described in the patents noted above were high; however, practical experience has shown that the processes and apparatuses described in the above patents have not found commercial acceptance due to difficulties in producing cast aluminum parts with reliable physical properties, such as strength. Accordingly, there continues to be a need for improvements to processes for solution heat treating cast metal alloy parts using infrared energy as a heat source.

This inventor has spent more than 10,000 (independent, not for hire) hours over the last 15 years consulting with experts in the various fields of physics, metallurgy, infrared emitters and refractory technology. This research activity resulted in several different renditions of an infrared heat treatment apparatus and an evolved method of application. As part of this research and development effort several specific issues defining the previously cited systems and many of the processing systems operating in some of the largest casting facilities in the USA were collected and are included as background to the presented apparatus and method.

Specific issues were noted upon examination of several infrared systems (e.g., heat treatment, coating curing, industrial and chemical processing) corrections for which became components of the design rules incorporated into the present embodiment:

Inefficiencies of T-3 Bulb as a Radiating Emitter

Many systems use the T-3 quartz incandescent high-output lamp with a radiant source temperature of 2,204° C. In fact, the tungsten element can reach temperatures exceeding 3,000° C. But the quartz bulb cannot. Quartz softens near 1,660° C. More importantly, the Quartz bulb is at best less than 90% transmissive at wavelengths of greater than 150 nm. The quartz bulb is only about 90% transmissive at 1.25 μm, which is approximately the center point of the emitted wavelengths for a system with a characteristic temperature of 2,204° C.

The quartz bulb of a 1 kW emitter system may be cooled at a rate that will limit the temperature of the bulb to prevent it from melting. This will require removing at least 100 Watts of thermal energy while the balance of the energy is radiated in the pattern of roughly a cylinder as a Lambertian radiator. A Lambertian radiator will appear to have the same radiant power at any angle of observation. This means that the tube of the T-3 lamp will emit maximum power normal to its long axis in a full 360° radiating pattern and will appear to an optical sensor to be of constant brightness at any viewing angle.

Attempts at placing reflectors inside the heat treatment oven are problematic. Ideally a full parabolic trough reflector should surround each T-3 bulb. To be effective the reflector would redirect nearly 270° of the full radiating pattern towards the intended target. Such a reflector would also direct a significant portion of the radiated power back through the bulb, causing a significant increase in bulb heating. The result is that less than a quarter of the radiant energy is radiated at the temperature of the tungsten element and passes through the quartz bulb towards the intended target, while nearly three quarters of the radiant energy is radiated off axis most of which is intended to be captured by the reflector system and directed towards the target. As such, the effective radiated power to reach the target is dramatically reduced. The lost energy may be collected by the bulb cooling system. Bulb cooling systems usually involve water cooled or air-cooled trough reflectors and bulb end caps.

A further revelation relates to the water-cooled bulb end-caps required to cool the quartz bulb. U.S. Pat. No. 8,865,058 locates the bulb caps outside of the oven proper and flows cooling gas around the bulbs to keep the quartz from getting soft. Water-cooled bulb caps and water-cooled reflectors are commonly located inside the oven proper on many existing infrared heat treatment or coating curing ovens. Either approach presents a serious radiant energy management problem inside the oven proper that will be examined later in this disclosure.

Appropriate Wavelengths to Use when Heating Aluminum

The T-3 radiant system is usually chosen because of its high power output, however the high temperature of the T-3 may not be the optimum radiant energy source for the application of heat treating aluminum castings. The question is, "Does the shorter wavelength with the advantage of the more effective radiant energy transmission outweigh the longer wavelength and the potential for increased absorption?"

From Einstein's writings about coefficients for emission and absorption (a and b coefficients discussed in Einstein, A. (1910), "Strahlungs-Emission und -Absorption nach der Quanientheorie") it can be deduced that good reflectors will also be good absorbers. From the Planck Hypothesis, high frequencies (shorter wavelengths) have greater energies and also from the Planck Hypothesis electromagnetic energies only exist as discrete quanta or photons. Of course these works are foundational to Laser theory, but in the early 1900's these works had thermodynamics as their field of focus. Here they point to the fact that absorption and reflection involve additional thermodynamic considerations that are wavelength dependent. For some metals, shorter wavelengths below and through the visible spectrum involve photon energies that match available electron band energy levels; but other materials, typically non-conducting materials, are transparent to high-frequency electromagnetic radiation and opaque to lower frequencies. Care should be taken here because what appears to be "transparent" can actually be an absorption and a retransmission within the material. The metallic radio antennas on a cell phone do not reflect electromagnetic energy but they are very good at absorbing it and retransmitting it within the material, i.e., conducting electricity along its length. This is true when the antenna is tuned or impedance matched, a term that relates the wavelength of the electromagnetic radiation and the speed of propagation or the effective transmission within the metal conductor which, done perfectly, eliminates any reflection.

Planck and Einstein provided some evidence that radiating energies beginning from a solid body (ideally a blackbody) are released in discrete quantities and these energies are captured when striking a solid body (ideally a blackbody) in discrete quanta. We get some idea of these issues when we heat most metals that are a solid at room temperature and the human eye sees the material radiate red. The human eye has a limited bandwidth, termed the "visible spectrum." Thermal spectroscopy is the science of recognizing the elements by their wavelength of emission over a relatively wide spectrum (wider than the "visible spectrum") as the material heats and its temperature rises.

The properties of aluminum and aluminum castings are one of the principal focuses of this disclosure; as such, it is important to note that unlike materials from copper to iron, aluminum does not turn red before it melts. Thus this inventor has made some assessment of this fact to drive the development of a quite hot infrared emitter that can be tuned to wavelengths longer (i.e., lower temperature) than the typical operational wavelength of the T-3 emitter. The emitter disclosed in this patent has a minimum wavelength approximately 50% greater than the characteristic wavelength of a high-power incandescent bulb such as the T-3 system. But more importantly, the new emitter can be tuned to effectively radiate at wavelengths much longer than competing technologies. Still, there are compounding considerations such as the surface texture of the casting. These physical aberrations can be viewed as somewhat akin to the properties of an antenna and treated with some aspects of antenna theory.

Appropriate Wavelengths are Relative to Surface Roughness

Reflectance is inversely proportional to surface roughness and directly proportional to wavelength. Polished surfaces of high-conductivity metals with an abundance of free electrons make good reflectors. These considerations are compounded by the non-polished surfaces of the aluminum casting removed directly from the mold. Here, if the wavelengths are short compared to the surface roughness features and yet long enough to be more likely to cause thermodynamic absorption and transmission within the material, then a very high degree of the radiant energy will be coupled into the casting (C.D. Wen International Journal of Heat and Mass Transfer 49 (2006) 4279-4289). Again this has an analog to electromagnetic radiation and some aspects of antenna theory. The fundamentals of quantum theory and thermodynamics were the basis for some of Einstein's early work. Although it is sometimes difficult to understand, this inventor has tried to relate an understanding of this analysis to the observed facts that have been collected over nearly 20 years of field and laboratory research.

Typical aluminum castings from permanent molds have surface roughness rates on an Ra scale (average peak to valley over a unit area of the surface in micrometers) of about 2 µm to about 3.3 µm. This compares to the Wien's Displacement Law for Blackbody Radiator's relating the stated wavelengths to temperatures from about 600° C. (1,100° F.) to about 1,200° C. (2,200° F.).

From the above discussion, this inventor recognized that aluminum has much higher thermal conductivity than iron, but significantly lower than copper. Yet both copper and iron will glow red before they melt. Aluminum does not. Aluminum appears to have a better thermodynamic "impedance match" to infrared radiant energy than most other metals and as such is a better absorber of thermal radiation of the optimum wavelength.

This means that for a given roughness of the aluminum surface there is an optimum wavelength to minimize reflected radiant energy and maximize the absorbed radiant energy. The optimum radiant source (e.g., infrared emitter) for heat treating aluminum castings will be one that can be tuned over the wavelengths of interest (i.e., from about 2 µm to about 3.3 µm). Such a method for the estimation of an optimum wavelength given a measured surface roughness (e.g., using optical non-contact surface profilometer) and a process of creating the optimal thermal profile would include driving the radiant sources to the optimal temperature (i.e., wavelength) for the necessary time of exposure.

The Misconceptions about Reflectivity in a Stefan-Boltzmann Environment

All of the previous oven systems examined by this inventor present a similar problem of radiant energy management inside the oven. There is much discussion about the reflectivity of the materials inside the oven proper. In fact, the nature of the oven interior is subject to the Stefan-Boltzmann Law for radiant energy sources. As derived from the Stefan-Boltzmann Law, radiant energy flows from the hotter source to the colder receiver as the fourth power of the difference in the temperatures between the source and the receiver. The cooled end caps and or the cooled reflectors inside the oven proper of the T-3 bulb systems become extremely effective infrared energy sinks and will consume much of the available radiant energy inside the oven proper, especially as the temperature of the casting increases to be near the solutionizing temperature. Cooling the T-3 bulbs with forced gas flow inside the oven reduces the energy available to heat the casting. The end result is significantly lower radiant energy transfer efficiencies than anticipated by the systems designers.

Optical Infrared Sensors in a Stefan-Boltzmann Environment

All of the above considerations are compounded by the incorrect assumptions made relative to the use of a radiant energy sensor (the pyrometer) in the presence of the high output energy sources as compared to the energy emitted from the casting. As shown in the Stefan-Boltzmann Law, the effectiveness of the radiant energy transfer is proportional to the $4^{th}$ power of the difference in temperature. Using a properly cooled infrared sensor to examine the casting at a temperature of approximately one quarter of the temperature of the infrared source would indicate that the high temperature source would dominate the radiant energy of the casting by a factor of more than 200 to one (given the Stefan-Boltzmann Law). There is nothing that could be gained by measuring the background temperature and trying to compute the actual temperature of the casting in the presence of the high temperature radiant source given the exponential relationship.

Considerations for Shielding Optical Window

The field surveys by this inventor also found that all of the fielded systems examined did not properly shield the infrared sensor or pyrometer from continuous exposure to the radiant energy in the solutionizing oven. Prolonged exposure of just a few seconds will cause the "window" of the sensor to heat up and become the dominating radiator in the sensor's field of view. Even actively cooling the housing of the sensor window will not effectively eliminate the thermal contamination of the measurement.

BRIEF SUMMARY

In an embodiment, a metal casting is heated using infrared energy by introducing the metal casting into a heating chamber with infrared emitters directed towards the casting, and activating at least a portion of the emitters. The infrared emitters may have a metal coil that is partially embedded in a refractory material, and be tunable to emit wavelengths from about 2 µm to about 3.3 µm.

The infrared wavelength used to heat the metal casting may be selected based on a surface roughness of the casting. Surface roughness can be measured by measuring a roughness of a part cast from the same mold as the heated casting, which can be the casting that is being heated. Heating may be controlled by measuring the temperature of the casting while a shield is deployed that covers the emitters, which prevents radiations from the emitters from affecting the temperature measurement.

In an embodiment, each of the infrared emitters comprises a conductive coil, and at least 60% of the coil is embedded in a refractory material.

A process may include moving a thermal shield from a retracted position to a deployed position to shield a temperature sensor from infrared energy from the infrared emitters, measuring a temperature of the part using the temperature sensor and moving the thermal shield from the deployed position to the retracted position after measuring the temperature. The thermal shield may provide a line of sight path between the metal casting and the temperature sensor, and the thermal shield may have a shielding part that is disposed between the infrared emitters and the metal casting in the deployed position. The metal casting may be an aluminum alloy, which may be in the form of an ingot.

In another embodiment, an "In-Line Heat Treatment" process is a process that receives a proper casting, cast using a liquid parent metal (e.g., aluminum) with added elements uniformly suspended in the liquid solution. The casting is removed from the mold as solidification from the outside-in enables physical transport of the casting to the heat treatment oven. There the casting is quickly reheated to the solutionizing temperature, very near the melting temperature of the parent metal (e.g., aluminum). As the casting reaches the solutionizing temperature; it is removed from the oven and rapidly cooled (quenched) while still hot and in a solutionized state.

In-Line heat treatment can reduce the energy required to heat treat a part by as much as 90%, while reducing the time allotted to the heat treating process by as much as 97%.

In an embodiment of an in-line heat treatment process, most of the added elements within the center of the casting do not significantly cool and thus do not have the opportunity to form large nuclei. The many smaller nuclei of the melt solution near the center of the casting are preserved. The larger nuclei formed as the outer portions of the casting cooled during transport from the mold to the oven are sufficiently diffused and migrate to smaller nuclei during the rapid heating of the casting in the high intensity oven. The uniformly distributed smaller nuclei are "frozen" as the casting is quickly removed from the oven and cooled in the quench tank.

This fine-grain distribution of the elements in the solid solution results in a product material with improved physical properties. Since by definition the casting has to solidify enough to be physically stable to be handled, the temperature will be lower than optimum and some nuclei will have formed. The challenge then is to quickly heat the casting back up and break down any nuclei that have formed and then quickly quench the casting at the appropriate quench temperature to begin the artificial aging process, and doing all of this while applying minimal supporting physical pressures to the casting.

As the inventor re-examined the preceding attempts at infrared heat treatment of cold castings and at the opportunity for in-line heat treatment including his own, he realized that a more academic or structured approach to the systems design of an in-line heat treatment oven system was required. Embodiments that follow this approach may have one or more of the following features:

An effective infrared radiating source is created that would target the optimum wave length given the measured surface roughness of the expected aluminum castings. This source may be precisely controllable to enable the tuning of the radiant wave length to the optimum fit for each particular mold type and application. The radiant source may maintain very high efficiency throughout the range of wave lengths that are used.

As preparation for a thermal profile characterization a casting from the specific mold will be surface profiled (e.g., using a profilometer) to determine a first order estimate of the surface roughness produced by that specific mold. This estimate is used to aid in the development of the optimum thermal profile to be applied during the solutionizing of this type of casting.

A first article casting will be processed in the solutionizing oven to characterize the thermal gradient profile in advance of production operation.

The radiant source should not require cooling, which will allow the system to maintain high radiant energy transfer levels and achieve high efficiencies.

The radiant source should not provide thermal energy loss paths to the oven environment in order to render the highest efficiency possible.

The radiant source should have a natural directivity inherent in its design configuration and require a minimum of reflectors or aiming devices.

The inside of the oven should be free of radiant heat sinks. All surfaces may be made up of radiant energy sources or have an effective reflector or refractory insulator/isolator that provides a highly efficient reflective shield to return or redirect radiant energy to the target. True refractory materials have a very low thermal conductivity but a very high thermal capacity. As such the surface of the refractory material will heat up rapidly, but minimally conduct heat away from the active surface. Instead the refractory will return nearly all of the energy impending on it as radiated energy. A proper refractory will quickly heat up and minimize the Stefan-Boltzmann Law radiant transfer effect.

The infrared sensor or pyrometer should be effectively shielded from the radiant energy of the oven's radiant emitters. The time limited exposure of the pyrometer should be only to the casting or part being measured. All other infrared sources should be masked or blocked. The procedure will keep the sensor "window" from heating up and contributing to the sensor input data. It is advantageous to keep the sensor "system" cool relative to the oven environment when not making an actual measurement.

When the sensor is used to make a measurement, the sensor exposure to any portion of the oven environment should be as brief as possible; preferably the exposure should be limited to a few seconds maximum.

When the infrared sensor or pyrometer is actively used to measure the temperature of the casting all other sources of radiant energy should be effectively removed from the field of view of the sensor. When the sensor "sees" the target casting, the casting should be the dominant source (highest temperature) of radiant energy by at least a factor of 200 to 1.

One way to do this is to provide a movable, highly reflective or refractive shield which has a minimum physical bulk; the key is to provide an oven design that permits a full tunnel shield to be inserted inside the oven such that radiant energy from the infrared sources on the sides and the top of the oven are removed from any path to the casting for a few seconds while the infrared temperature sensor or pyrometer is uncovered, positioned and used to make a few temperature measurements very quickly. The shield is then withdrawn and the infrared sensor is re-covered.

Energy loss is minimized when the moving shields are in place as the electrical drive to the infrared emitters is removed for the period of the measurement. As the shields are withdrawn the drive to the emitters is returned.

When this pseudo-blackbody is created, the casting, even though it has a rough surface, will radiate from its surface a sufficient amount of radiant energy to enable the sensor to provide an accurate measurement of the casting temperature.

The moving shield thermal source isolator does not require the sensor to be positioned to exploit a "black body" radiating opportunity on the physical structure of the casting. All of the casting or part in concert with the cool shield becomes the "black body" radiator opportunity where the casting or part is by far the dominating radiant source in the field of view of the sensor.

Implementing the physical structure of the heat treatment system such that the volume of space between the infrared emitters and the castings to be heated is at a very low absolute pressure (e.g., a vacuum) eliminates any convection currents, restricting the exchange of thermal energy to contact and radiant processes.

Further, the low pressure environment reduces the oxygen level to the point where oxidation losses are significantly reduced from the typical 7% average as currently experienced with heat treating in an oxidizing atmosphere.

The unique capability of an embodiment of highly directive infrared emitter technology to project thermal energy through a window or to be mounted inside a vacuum chamber to provide heat treatment energies without the convection flow of thermal gases is a significant process improvement. Heat treating aluminum without exposure to oxygen leads to significant savings in oxidation losses of aluminum. Current oxygen-free heat treatment technologies use convection processes consisting of nitrogen or some inert gas as a conveyor of thermal energy, but the convection process dramatically limits thermal efficiency.

Effective thermal shielding can also be used to limit losses of thermal energy inside a vacuum or very low absolute pressure heat treatment oven system. Without convection currents, thin highly polished aluminum and/or refractory shields can dramatically reduce the radiant thermal absorption of the oven walls. Careful shaping of the reflectors can reduce bounce and second-collision rays to push energy towards the target.

Losses due to the Stefan-Boltzmann Law effect are minimized by eliminating or significantly reducing the convective losses to the oven walls and significantly shielding the oven walls from a direct radiant path to the source emitters through the use of low thermal conductivity, high thermal capacity refractory to line and isolate the cool oven walls. This enables a low loss "water-cooled" heat treatment oven implementation. A water-cooled heat treatment oven is much easier to "seal" using rubber or silicon gaskets and thus significantly enables the implementation of a vacuum oven system.

In accordance with another aspect of the present disclosure, a method for generating a thermal gradient profile for the heat treatment of a metal alloy part is provided. One embodiment of a method for generating a thermal gradient profile for the heat treatment of a metal alloy using infrared radiation as an energy source includes the step of first providing a typical casting removed from the exact mold type for which this heat treatment system is providing service. A surface profilometer is used to analyze the surface roughness of the part. Thermal energy in the form of infrared radiation at a selected wavelength is applied to a surface of the test part. Data is collected that is representative of a temperature of the test part as a function of time making use of the radiant energy shields to enable the pseudo-blackbody measurement technique using a cooled infrared sensor. From these measurements a thermal gradient profile is created that will enable an automated process.

When the thermal gradient profile directed process is complete, the casting is removed from the vacuum chamber and dropped into a temperature controlled quench tank. At the quench temperature, it is removed and inserted into the artificial aging apparatus.

The artificial aging apparatus is similar in appearance to the solutionizing oven but equipped with fewer radiant sources. This apparatus can precipitation-harden (artificially age) castings using a similar thermal gradient profile technology.

The present disclosure provides a system of apparatuses and methods for using non-contact optical sensors, optimized infrared radiant emitters, and a controller to enable the in-line heat treatment of metal alloy parts removed hot from the mold. This disclosed system of apparatuses and methods overcomes the drawbacks evident in previously disclosed systems for using optical sensors and infrared radiation as a thermal energy source for heat treatment of metal alloy parts.

Embodiments of the present disclosure include several specific and generalized improvements that enable the solutionizing heat treatment of castings of various temperatures, most importantly "hot from the mold." One purpose of these improvements is to improve efficiency and functionally and to enable the insertion of these apparatuses and operational methods into a serialized ("in-line") production process, efficiently improving the process flow and reducing the overall manufacturing process costs.

An improvement of embodiments of this disclosure is the management of the applied radiant energy as enabled by the reliable and accurate measurement of the casting's temperature. Three additional important and significant apparatus implementations to be disclosed in this patent include the infrared sensor heat shielding and window system, the radiant emitter extended tunability, and the oven wall shielding system.

BRIEF DESCRIPTION OF THE DRAWINGS

The foregoing aspects and many of the attendant advantages of this disclosure will become more readily appreciated as the same becomes better understood by reference to the following detailed description, when taken in conjunction with the accompanying drawings, wherein:

FIGS. 3.A and 3.B are from a view taken along line 3-3 in FIG. 1 (3.A shows heat shield removed; 3.B shows heat shield in place);

Figure 1:
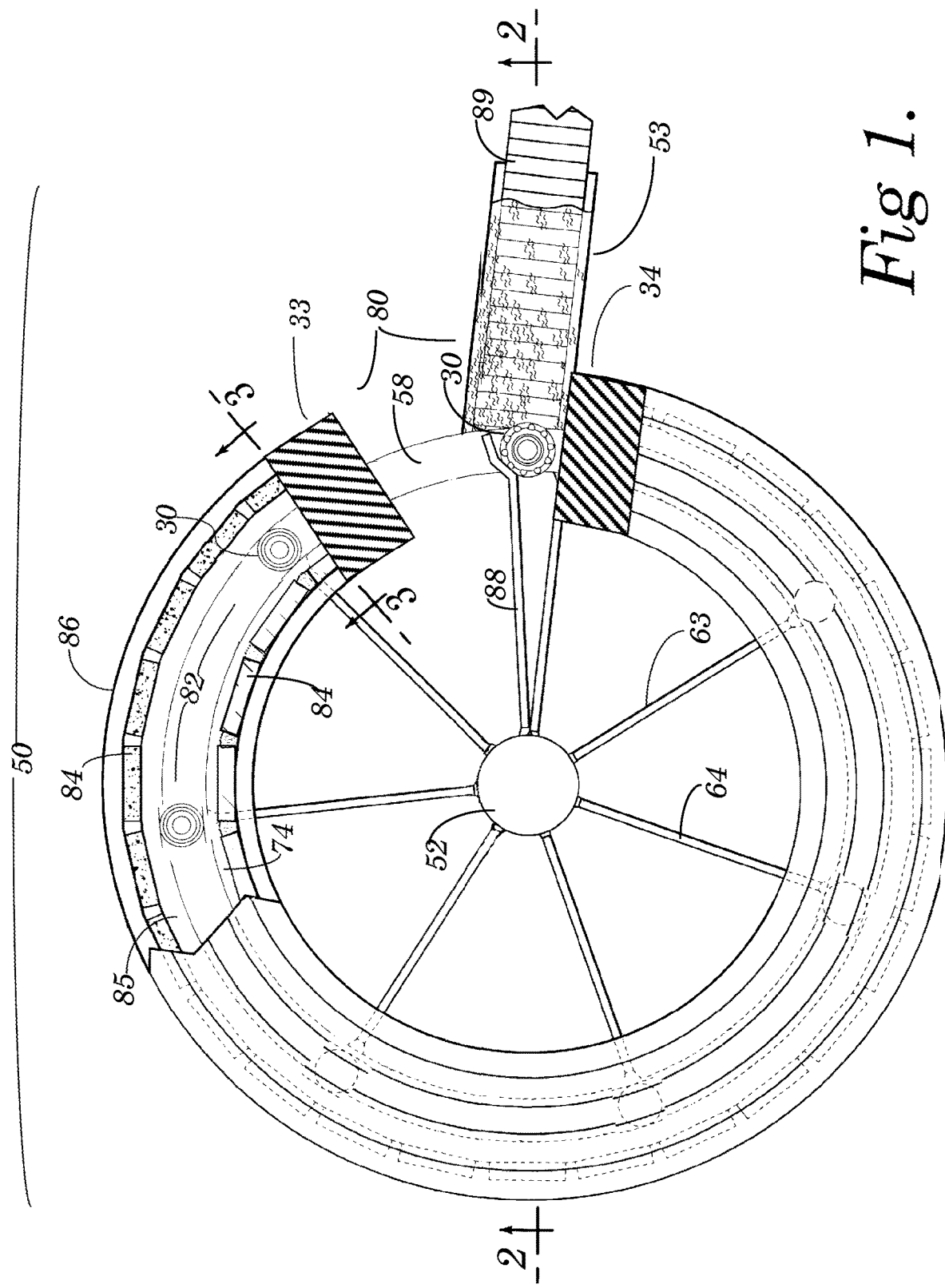
FIG. 1 is a top plan view with a portion cutaway of an apparatus for heat treating a metal alloy part formed in accordance with the present disclosure.

The following is a list of items shown in the aforementioned diagrams, followed by a brief description of the item.

ITEM # DESCRIPTION

30 The individual casting
32 Shielded sensor observation duct

33 Double ended vacuum chamber entrance doors
34 Double ended vacuum chamber exit doors
40 Infrared radiation
41 Low Density Ceramic Insulation of emitter
42 Length of nickel chromium coil that is exposed in emitter
43 Castable Ceramic Refractory of emitter
44 Cutout showing detail of emitter
45 Emitter Mounting Bracket
46 Embedded thermocouple
47 Enlargement of instrumented coil of emitter
48 Thermocouple leads
49 Machined ceramic screw/retention device
50 Rotary oven
52 Central control hub
53 Quench tank
54 Rotating coupling of transportation system
57 Shield pass-through slot
58 Rotating circular support carriage
59 One section—⅛th of 58
61 Water jacket
62 Lower pressure hull
63 Truss assembly
64 Upper rotating truss
65 Cooling chamber
66 Lower stationary truss
70 Outside shield-positioning apparatus
74 Inside refractory stationary floor
80 Casting loading area
82 Heating channel
83 Insulating flanges on the floor
84 Individual radiant emitters
85 Outside refractory component of oven floor
86 Upper pressure hull
87 Interior refractory oven roof
88 Spring-loaded exit arm, oven
89 Quench tank conveyor
90 Thermal sensor/shield assembly
91 Optical thermal sensor
93*a* Sensor port thermal shield closed
93*b* Sensor port thermal shield open
94*a* Casting thermal shield in cooling chamber
94*b* Casting thermal shield deployed around casting
95 Station around which shield rotates
98 Shield-positioning apparatus, inside
100 Lower fluid path
101 Shield outside lower bearing block
102 Shield inside lower bearing block
104 Fluid, vacuum distribution manifold

DETAILED DESCRIPTION

The following detailed description of an embodiment of the present disclosure proceeds with reference to the heat treatment of an aluminum alloy 356 cast into a wheel hub. It should be understood that the scope of the present disclosure is not limited to aluminum alloy 356 or to wheel hubs. Suitable aluminum casting material, such as 356 aluminum, can be used to create castings using conventional casting techniques such as gravity casting, low pressure, squeeze, semisolid and die casting all of which would be compatible with the scope of the present disclosure. The 356 aluminum alloy generally includes approximately 6.0-7.5 weight percent silicon, 0.25-0.45 weight percent magnesium, less than 0.2 weight percent iron, less than 0.2 weight percent titanium, 0.008-0.04 weight percent strontium, and the balance aluminum. It should be understood that the aluminum component of the 356 alloy can include residual amounts of other elements that may be present in the alloy material, such as manganese, copper, calcium, zinc, barium, carbon, zirconium, and sodium. Other suitable casting alloys include but are not limited to A390, A392, A393, A356, A333 and A357 in aluminum, and other alloys of magnesium. For the purposes of this disclosure, a part is an item that is to be subjected to infrared radiant energy using one or more of the methods or apparatuses of this disclosure; to create the part, the part may be cast, extruded, machined, punched, blanked or formed by any other means. To simplify the following discussions, a part no matter how it was formed, will be termed "casting(s)."

The following description of the present disclosure is in the context of an embodiment comprising a solution heat treatment apparatus. This basic apparatus is not intended to be limited to solution heat treatment, and is applicable to other heat treatments, such as annealing and artificial aging in various combinations. The presentation of the disclosure in this inventor's earlier U.S. Pat. No. 5,981,919 is a valid disclosure of the structure, oven component location and arrangement, utilities support and routing of power, and again is not limited by this physical configuration. In fact several research and developmental ovens have been built by this inventor in the last 16 years that differ in arrangement of the serialized oven segments. There have been circular oven systems and densely packed, water-cooled ovens with automated material handling systems for casting delivery; as well as more linear arrangements with the shortest being an oven system of just one heating segment followed by a temperature controlled quench tank and a return to the oven to initiate the artificial aging process.

However, the pseudo-blackbody effect created by the insertion of the cool thermal shield 94*b* described herein optimizes the detectable energy emanating from the pseudo-blackbody source and masks such factors as surface roughness, color, reflectivity and other properties that affect the emissivity of a surface, and thus the temperature of the surface as measured by an infrared sensor. Since it is contemplated that the heat treatment of multiple castings will be controlled based upon a given thermal gradient profile, it is important that the temperature measurements taken from a given casting not be affected by variances in the emissivity of the surface of the casting. Measuring the temperature of the casting by monitoring the emissions of a pseudo-blackbody source minimizes variances attributable to the emissivity of the surface; thus more reliable control of the heat treatment process can be obtained.

Figure 2:
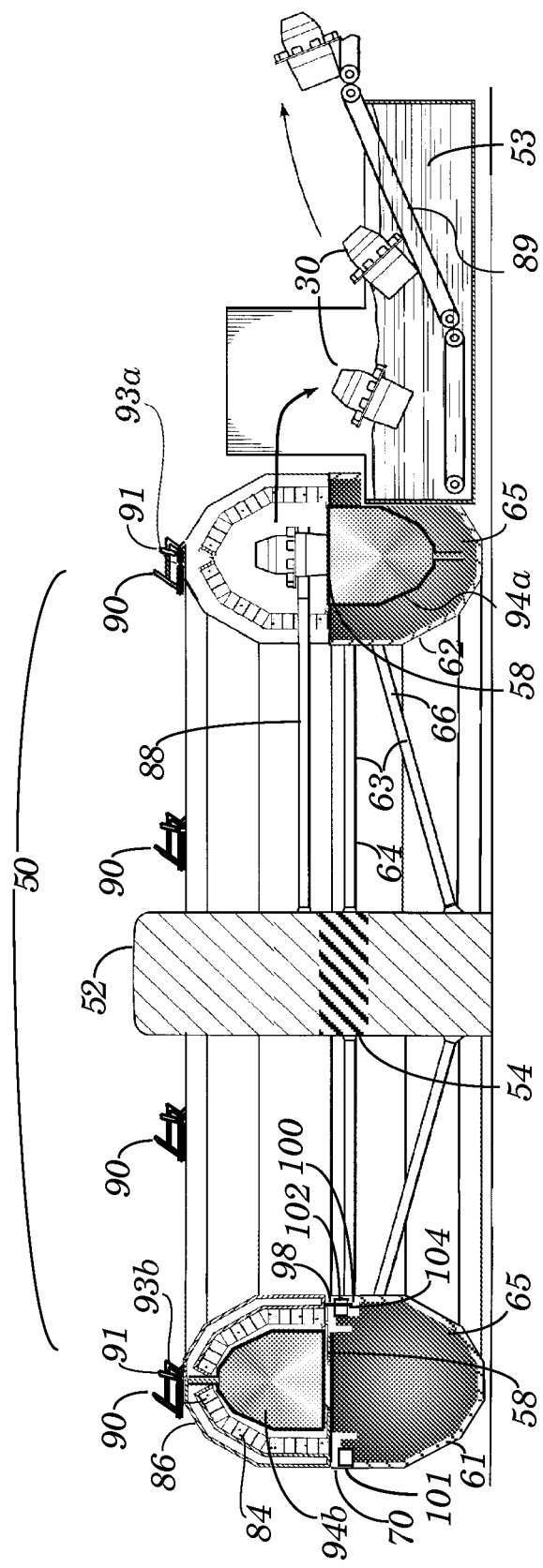
FIG. 2 is a view taken along line 2-2 in FIG. 1.

As shown in FIGS. 1 and 2, one embodiment of an apparatus for heat treating a metal alloy part formed in accordance with the present disclosure includes rotary oven 50 arranged in a circular configuration to carry a plurality of castings 30 past a plurality of infrared radiation sources 84. While the present embodiment of an apparatus for heat treating metal alloy parts is described and illustrated as a rotary oven, the present disclosure is not limited to rotary ovens. Other geometric configurations of an oven will fall within the scope of the present disclosure. For example, a linear oven or an oven arranged in a noncircular configuration are also examples of ovens useful in accordance with embodiments of the present disclosure.

Figure 4:
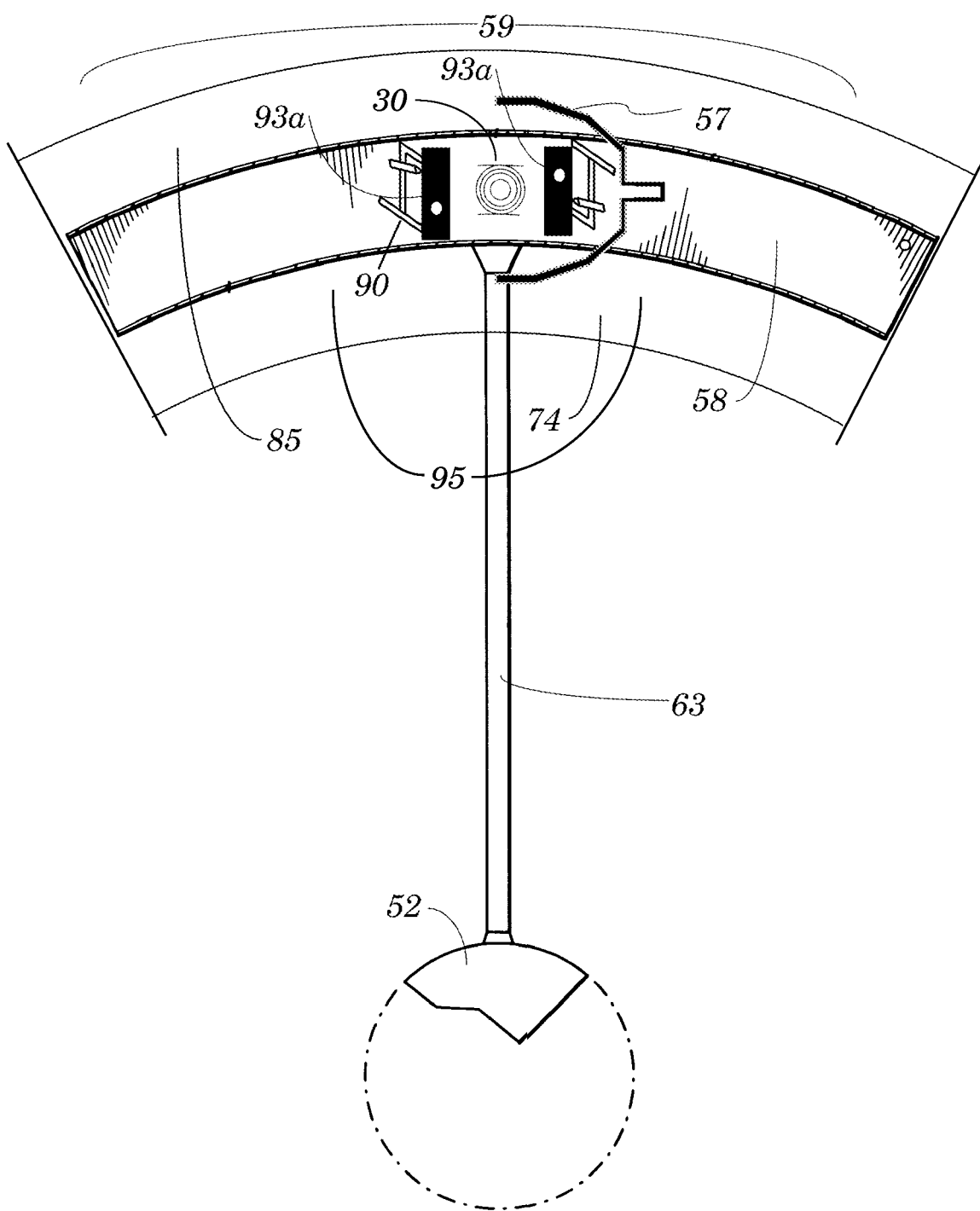
FIG. 4 is a top plan view of a segment of the apparatus of FIG. 1 showing the placement of two sensors on the top of the channel which are used for taking the measurement of the casting inside when the thermal shield is in place around the casting to create a pseudo-blackbody (view shown is while thermal shield is in the cooling chamber and optical sensors are shielded)

Rotary oven 50 includes two major components: a heating channel 82 that houses a plurality of infrared radiation 40 source emitters 84 and a transportation system (comprising upper rotating coupling 54, central hub assembly 52, rotating truss 64, and circulating support carriage 58), for transporting casting 30 through heating channel 82. In the illustrated embodiment, support carriage 58 comprises a plurality of sections 59 as shown in FIG. 4. The following description will proceed first with respect to the transportation system, followed by a discussion of the heating channel.

Each section 59 defines a one-seventh portion of the circular support carriage 58. Support carriage 58 is in the shape of a segmented annular ring having an average diameter that is substantially the same as the diameter of heating channel 82. Support carriage 58 is wide enough so that it can support substantial castings, most larger than the model casting 30 (e.g., wheel hub), on a top surface dimensioned to carry parts to be heat treated in accordance with the present disclosure. The segments of support carriage 58 are sized such that when the computer stops rotation at a measurement/heating station 95 along the heating channel 82, the segments of the support carriage allow the rotation of the cool radiant energy shield (94a while in cooling chamber, 94b while in place around casting) through slot 57 into place for a temperature measurement and then the rotation of the shield (94b/94a) back through slot 57, returning to the cooling chamber 65.

Vertical walls extending up and down from the inner and outer concentric ring surfaces on the inside and the outside of rotating support carriage 58 tilt towards each other to form three steps on each side as they meet to form a flat roof 87 and a floor 74, 85 that is a fully enclosed elliptical cross section outer pressure hull 86. Support carriage 58, in an embodiment, comprises multiple sections 59, each section includes a location for a casting 30, however other constructions, such as one-piece construction or a construction with more sections are considered to be within the scope of the present disclosure. Each of these locations is defined as a station 95 that moves through heating channel 82 under computer control based on the appropriate thermal gradient profile. At the station 95 locations the carriage 58 is segmented and provides a support apparatus for the thermal shield 94a/b where at these sites a lower bearing block, inside 102 and outside 101, support the shield 94a/b positioning apparatus 70 outside and 98 inside. Block 102 extends along the inside length of each section 59 of support carriage 58. Plate 102 at its outermost edge includes a plurality of spaced-apart openings 104 allowing upper section 98 to be in fluid communication with lower section 100. This enables cooling fluid to pass between the upper oven pressure hull 86 and lower pressure hull 62 as well as to remove heat from support carriage 58. Support carriage 58 can be a weld up from rigid strong tubular material such as steel and fitted with machined refractory materials to provide structure and working surfaces. Each of the adjacent sections 59 is fitted independently with cooling fluids, electrical power, vacuum connections and control signals through truss assembly 63 including stationary truss 66 and rotating truss 64. The segments 59 of circular support carriage 58 can be connected in a conventional manner, such as with fasteners in order to form the circular support carriage 58.

A central hub assembly 52 of a conventional design serves as the central pivot for transportation system (upper rotating coupling 54) that carries the castings 30 through heating channel 82. Support carriage 58 is supported for rotation around central hub assembly 52 by a plurality of truss assemblies 63 that extend radially from an upper rotating coupling 54 mounted on central hub assembly 52. The upper truss coupling 54 rotates around central hub assembly 52 by conventional means, such as an electric motor. In addition, central hub assembly 52 routes cooling water, vacuum, electrical power and control signals through the truss system 63.

Truss assembly 63 includes upper rotating truss 64 and lower stationary truss 66. Upper rotating truss 64, which extends radially from the upper rotating coupling 54 and supports the rotating platform 58, terminates against the upper pressure hull 86 with fitted low-friction composite sliding seals that enable the penetration of the hull proper and the circulation of support carriage 58 while maintaining a vacuum. The upper pressure hull 86 and the lower pressure hull 62 are supported as an assembly by lower stationary truss 66.

Lower stationary truss 66 is attached to the lower fixed mount at hub assembly 52 and the opposite end is attached to the inner periphery of the pressure hull, upper 86 and lower 62, at mount point 102. Lower truss 66 routes cooling water, power and sensor signals to the oven pressure hulls 86, 62, and water jacket 61. Ideally, in order to reduce weight and provide conduits for carrying cooling water, power, vacuum and signal to and from support carriage 58 and the upper 86 and lower 62 hulls, trusses 64 and 66 are preferably thin-wall steel tubes of significant diameter to minimize flex.

In the illustrated embodiment, seven truss assemblies are illustrated; however, it should be understood that additional trusses or fewer trusses can be provided depending upon the load requirements for support carriage 58 and the number and size of the castings 30 to be processed.

As described above, support carriage 58 defines a platform on which metal alloy castings 30 to be heat treated in accordance with the present disclosure are moved at spaced intervals as the support carriage rotates. Referring to FIGS. 3.A, 3.B and 4, each of the spaced intervals 59 of support carriage 58 includes temperature sensing provisions mounted above the heating channel 82 where shield assembly 90 and sensor 91 are located at station 95 of each segment 59.

Referring to FIG. 3.A, the infrared sensor heat shielding assembly 90 and window system (93a while shielded from exposure to casting, 93b while exposed to casting in order to take measurement) provide a water-cooled backing to a refractory surface exposed to the internal oven environment or heating channel 82 and the casting 30 of which the temperature will be measured utilizing shielded sensor observation duct 32 which had been stored in the cooling chamber. When the oven is configured to enable a measurement, FIG. 3.B, of the casting's temperature, the infrared sensor heat shield assembly 90 is mechanically moved from its function of protecting the sensor 91 in position 93a to open the "window" 93b after heat shield 94b has been positioned into the heat treatment oven heating channel 82 blocking all of the hot surfaces inside the oven, presenting a field of view that is largely filled by the casting through the shielded sensor observation duct 32.

Foundational to the thermal management inside the oven system is the pressure enabling hulls 86, 62 and the use of a water cooled lining 61. The water-cooled lining 61 enables the use of conventional seals, allowing the evacuation of the atmosphere inside the cooling chamber 65 and the oven heating channel 82. Eliminating convection currents inside the oven heating channel 82 and cooling chamber 65 increases efficiency by restricting thermal transmission to radiant energy and direct physical contact.

When the interior of the oven is configured, as in FIG. 3.B, to enable a measurement by the infrared sensor 91, the infrared sensor 91 sees the inside of a box 94b with near-room temperature walls and which contains the casting 30 as the dominant thermal radiator located in the center. Infrared sensors are constructed by their manufacturers to report or capture the highest temperature in their field of view. In effect, FIG. 3.B shows the oven chamber with the hot casting 30 at the center converted to a pseudo-blackbody radiator system with the cold walls of the shield 94b and the hot casting 30 in the center as the dominant radiator.

The very important conditional feature is that this apparatus and method of implementation do not have any requirement for any aspect of the casting 30 to be symmetrical or feature a cavity in which to measure the temperature. This apparatus and method is much more robust and accurate while being more adaptable to any casting physical geometry.

In FIG. 3.B, the configuration of the heat treatment oven interior to enable an accurate temperature measurement is a very important apparatus disclosed in this patent. The apparatus consists of a set of lightweight heat blocking shields 94b constructed using highly polished aluminum and/or refractory coated panels. The shields 94b are mechanically inserted between the radiant emitters 84 and the target casting 30 so as to block all radiant transmission from the radiant emitters 84 and any other hot source into the internal cavity created by the shields 94b.

The emitter blocking shields 94b are inserted into the heat treatment oven heating channel 82 when a temperature measurement is required to assess the progress of the application of radiant energy to the casting 30. The insertion is timed to coincide with the exposure of the infrared sensor 91 by shields 90 and 93a. Thus the infrared sensor never sees the radiant emitters 84 and is only briefly exposed to the target casting 30. After radiant emitter shields 94b are completely inserted into the oven heating channel 82, the driving electrical power is removed from the infrared emitters 84 to aid efficiency and minimize the thermal energy reflected by or absorbed by the refractory layer of the shields.

The thermal dissipation of the fixed-on-the-oven-floor refractory shields that remain inside the pseudo-blackbody cavity formed by blocking shield 94b is such that as soon as the emitter blocking shields 94b are inserted, the emitter sourced thermal energy is removed as a component of the reflected energy towards the sensor. The refractive surface of the fixed shields 74, 85 and 87, direct their small thermal emissions towards the shield. Thus when the emitter shields 94b are in place the fixed shields 74, 85 and 87 are immediately blocked from reflecting the infrared sources 84 and only reflect energy emitted by the casting 30. The energy reflected is only a small contributor to the optical temperature sensor 91 because the optical sensors are designed to capture the peak temperatures. The reflected energy from the fixed refractory and reflective shields 74, 85 and 87 will have lost some thermal energy by the process of reflection and will not be peak contributors.

This entire operation of measuring the temperature of the casting 30 using the thermal isolation technique involving the insertion of the radiant energy shields 94b and the reveal of the infrared sensor 91 from behind its protective radiant shield 93a requires less than 3 seconds from the start of the movement of the radiant energy shields to the return of the radiant energy shields to their resting and cooling storage location.

The shield systems 94a/b, are designed to operate with a duty cycle as high as 20%. This means the system can deliver an accurate temperature measurement every 15 seconds (i.e., a 15-second cycle). This sample rate is more than adequate to verify that the system is maintaining its thermal profile as developed during the characterization process that is a component of the enabling method.

The shields 94a are cooled when in their storage locations by radiant cooling to the water-cooled pressure bulkhead walls. The infrared sensor radiant energy shield assembly 90 is water cooled and blocks a small window of ceramic glass 93a about one half inch in diameter which serves to provide a gas-tight seal at the sensor port. The shield assembly 90 is moved in conjunction with the deployment of thermal shield 94b to place the sensor window 93b in line with sensor 91 and shielded sensor observation duct 32 to expose the sensor 91 to the temperature of the pseudo-blackbody formed by the casting 30 within the thermal shield 94b.

Figure 5:
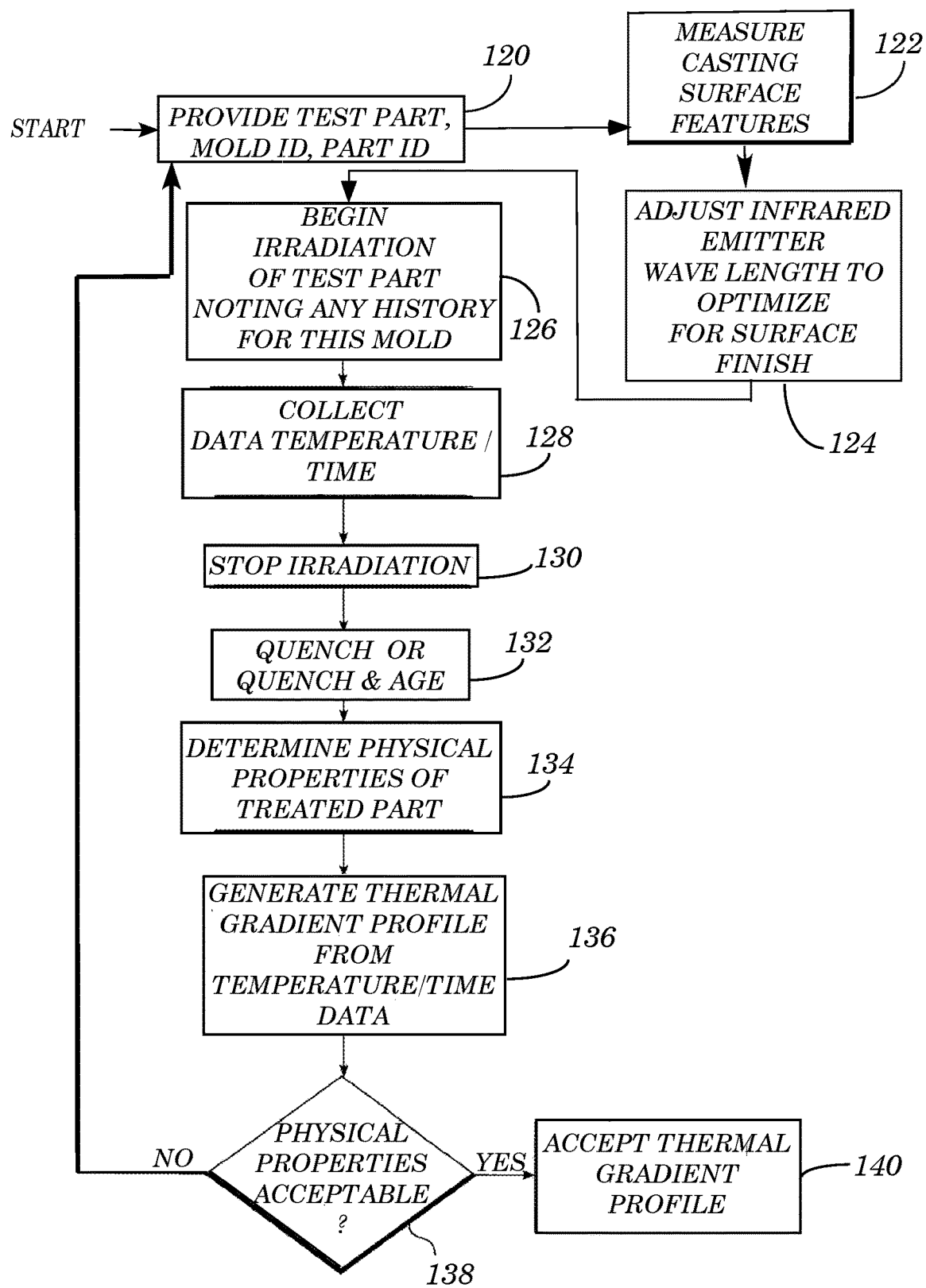
FIG. 5 is a flowchart of an embodiment of a method for modeling a heat treatment of a metal alloy carried out in accordance with the present disclosure.

Key to the coordination of the special apparatus of this disclosure is the evolved method of characterization of the thermal gradient profile as depicted in FIG. 5. Once characterized, the thermal profile provides a thermal map of the heat treatment process. Of the solutionizing, quenching and artificial aging processes, the solutionizing process requires a more sophisticated apparatus and method to accurately and repeatedly heat the casting along a successful heating profile.

Temperature measurement of the quenching process has been accomplished with thermocouples or solid state temperature measurement technology inserted into the quench tank. The quench tank is actively managed thermally by the use of large liquid-air heat exchangers with computer-controlled fans and a computer-controlled electric coolant solution pump to move the quench tank solution from the tank to the heat exchangers.

The castings are removed from that quench tank at an ideal temperature to begin the aging process. The artificial aging process is done in another oven system which can be nearly identical to the solutionizing oven system but of a lower power density design than the solutionizing oven; although other physical implementations are possible.

Figure 8:
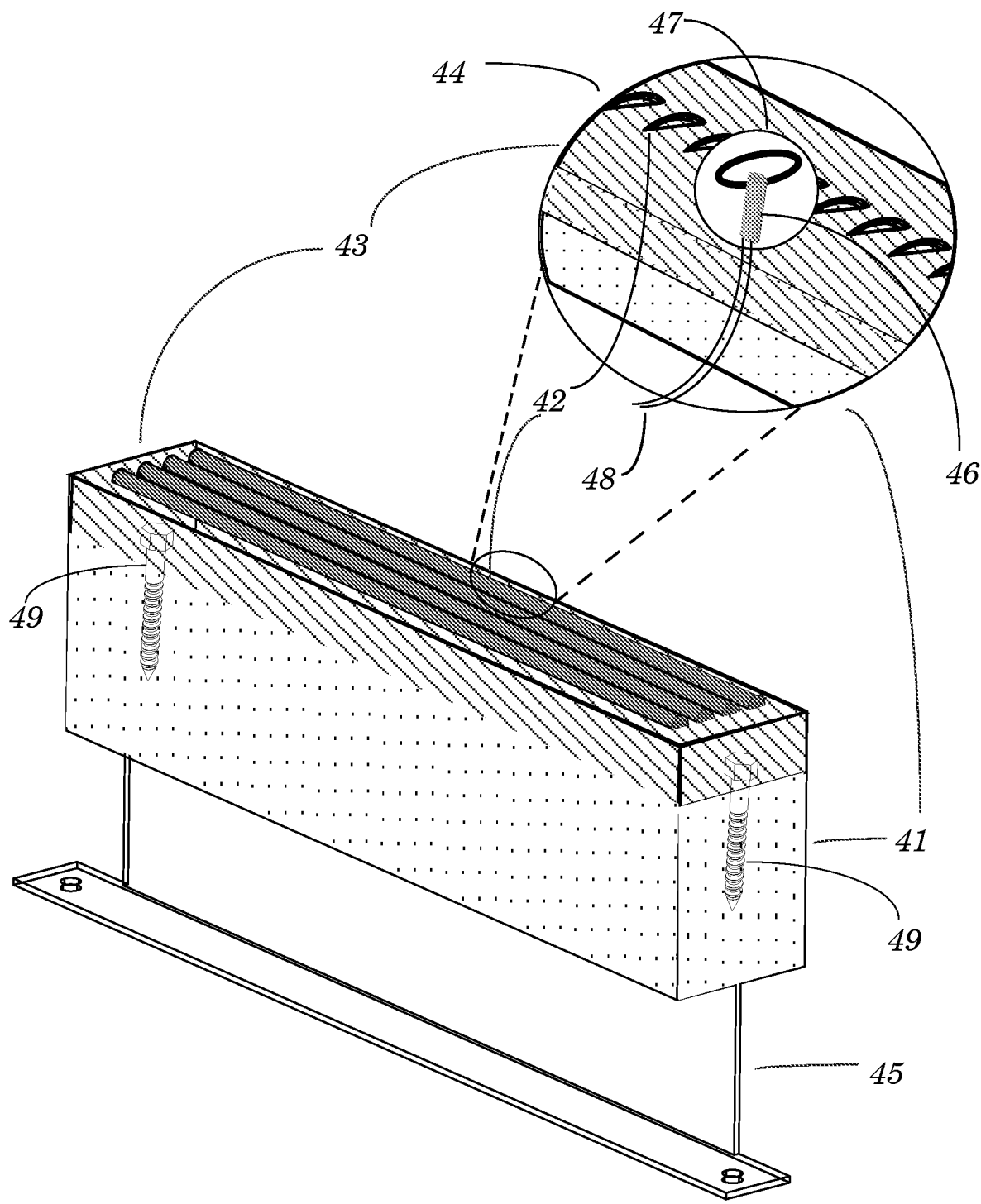
FIG. 8 shows the physical construct of the efficient, tunable, highly directive infrared emitter with an embedded monitoring sensor.

FIG. 8 depicts the design and construction of the new infrared emitters of this disclosure, which incorporate a coiled nickel chromium wire utilizing relatively small coils 42 (i.e., 12 to 17 wire diameters). These coils are set inside a ceramic refractory that is "cast" with the coils mostly submerged into the ceramic refractory, such that only a length of wire equal to approximately 12 to 17 diameters of the wire is exposed to radiate on one common surface of the castable ceramic refractory in a linear array of evenly spaced and co-aligned arcs, the wire coils positioned in and supported by the ceramic such that the surface tension of the coils overcomes plastic deformation for the selected range of heating.

The ceramic is poured into a mold that sits on top of a thick (>than 3") low-density fibrous ceramic refractory thermal insulator 41. Unlike existing emitters which use metal retention devices to secure the castable ceramic to the low-density ceramic insulation, which have a propensity for delamination because of the incompatibility of the coefficients of expansion, this embodiment uses pin or screw type retainer(s) 49 constructed from a machinable refractory with a coefficient of expansion which is compatible with the castable ceramic. There is a metal (aluminum) backing 45, but the edges near the radiant energy face of the emitter are refractory coated to form a significant thermal barrier.

Additionally a K, R or S thermocouple in a protective sheath of Iconel or Stainless Steel is embedded in the castable ceramic such that it is in contact with an embedded near center coil 47 making contact at the maximum depth from the surface of the ceramic. The thermocouple leads 48 are brought out the back of the emitter and routed to the data collection system.

The performance of these new radiant projectors is significant. The thermal conductivity of the devices that would contribute to thermal energy loss from the oven has been significantly reduced as compared to their already very efficient design. The very limited exposure (much less than 40% of each coil is exposed outside of the ceramic) of the nickel chromium wire coil segments, as depicted in magnified cutout 44, is the result of the ceramic matrix providing physical support to most of each coil's radiant surface. This feature allows reliable operation above the plastic deformation temperature for the nickel chromium alloy which was chosen for its robust thermal performance. These superheated coil segments are light enough that surface tension becomes a factor enabling the coils to maintain their shape against gravity and thus overcome plastic deformation and nearly doubling the useful temperature range of the emitter.

This construction restricts the emission of the radiant energy to a half cylinder near-Lambertian surface which concentrates the power of the emissions within 45° of normal to the long axis of the emitter for most of the emitter length.

The physical implementation of the coil embedment significantly extends the temperature range (i.e., wavelength) of the emitter and the embedded thermocouple enables a capability for variable but precisely controlled radiant energy output. This capability contributes to the optimum "tunability" of the radiant emitter and enables the reliable method of heating castings which, among other considerations, depends on the magnitude of the surface roughness. The effective "tunability" of the radiant emitters spans a temperature range from less than 300° F. to more than 2,200° F.

The tunability of the emitter disclosed in this patent enables improved heat treating processes previously unavailable. The emitter source temperature can be controlled to optimize the transfer of radiant thermal energy and can be controlled to regulate the heating effect to within a few degrees Fahrenheit between the emitter and the part being heated. This capability is optimized when there are no convection losses to be managed. The extended range of this emitter enables this capability to be applied from low temperature annealing processes to the rapid heating of large castings in a solutionizing process.

Conventional computer control systems can be used to control sensors and also to collect the temperature data as a function of time. As described in more detail below, the collected data can then be used to generate a thermal gradient profile for the treated casting and also to control the subsequent heat treatments of similar castings from the same mold by controlling the energy output from the respective infrared radiators in accordance with a control protocol described below in more detail. In addition to controlling the output from the infrared radiators, the computer may also control other variables, such as the speed that the parts are passed through the oven, the control of the sensor isolation shields and the radiant emitter shields activity related to the temperature measurement activity and the temperature of the quench water.

The following description of a control process carried out in accordance with the present disclosure for heat treating metal alloy castings is provided with reference to the apparatus described above. It should be understood that this aspect of the present disclosure is not limited to the apparatus described herein. Practice of the process described below with other apparatuses for heat treating a metal alloy part is considered to be within the scope of the present disclosure.

Once a profile is established for a particular mold type, then the profile can be accessed and joined "in-process" depending on the temperature of the casting upon insertion into the oven system. Thus this process can accommodate cold castings or "hot" casting removed from the mold.

As best illustrated in FIG. 3.A and FIG. 3.B, at each spaced interval, the refractory floor (74, 83, 85) will become a minor radiant contributor when the thermal shield 94b is in place. The sharp focus of the optical sensor 91 and the cool walls of the shield 94b with minimum thermal contamination from the sensor window 93b, will enable the sensor to observe the thermal energy radiating from the casting 30 with minimal dilution from other sources.

Rotating oven 50 includes casting loading area 80 that is preferably adjacent to a staging area for the castings 30. At casting loading area 80, access to the surface of support carriage 58 is necessary, and accordingly, the support carriage is not associated with heat channel 82 at this location. A high-density, machinable refractory 83, either optimized or complementary to each part type, serves as a physical support mechanism to casting 30.

The control computer will pause the carriage 58 at the casting loading area 80. From casting loading area 80, support carriage 58 advances the casting 30 into rotary oven 50 through the double-ended pressure locking entry doors 33. As noted above, rotary oven 50 includes a plurality of infrared radiation sources 84. In the illustrated embodiment, rotary oven 50 includes twelve banks of infrared radiation sources that each comprises twenty-four radiant emitters 84.

The control computer controls each radiant infrared emitter 84 individually. The radiant emitters are "tuned" to the wave length most appropriate to the surface roughness measurement component of the thermal gradient profile. Rough surfaces require a longer wavelength and more active emitters to obtain sufficient heating versus a smoother casting which will require hotter (i.e., shorter wave length) and fewer infrared emitters.

It should be noted that this method is optimized by the use of the "tunable" infrared emitter 84. Incandescent bulbs will not provide the linear tunable range of the "tunable emitter." The thermal management of the infrared radiant energy is dependent on the use of an emitter with a well managed emitter beam pattern of a half cylinder. Full circumference incandescent bulbs will not provide the necessary directivity or the tunable range of the infrared emitter 84.

Support carriage 58 transports individual casting 30 along the pathway through heating channel 82. At the end of heating channel 82, there is a double-ended pressure lock 34 exit from the heating channel. A spring-loaded arm 88 extends from the central hub assembly 52 into the pathway of casting 30. As casting 30 comes into contact with arm 88, the computer has the option to allow the arm 88 to force the casting 30 from their position on support base 83 and onto the quench tank conveyor 89 which delivers the parts for further processing, such as quenching, then aging. This provides an unoccupied carriage segment which then can be reloaded when it passes through the loading area 80. Or the computer can activate a motorized lift internal to central hub assembly 52 to raise the arm to allow the casting 30 to make another trip around the rotating platform 58 and delay the acceptance of a fresh casting for one or more cycles.

Temperature information for the castings 30 being heat treated is collected from the casting surface when a pseudo-blackbody measurement opportunity is created using a cool shield 94b that is positioned between the casting 30 and the array of infrared emitters 84 and hot radiant walls of the heating channel 82.

By collecting temperature data from a surface that is not being directly irradiated, a non-ambiguous, accurate reading of the temperature for the casting 30 at that surface can be obtained. The pseudo-blackbody created by the cool shield system 94b creates a compatible measurement opportunity for most commercial non-contact infrared sensors or optical thermocouples. These types of optical thermocouples are available from Exergen 35 Corporation of Watertown, Mass. Preferred sensors are those that have sensitivity in the temperature range to be monitored. In the context of heat treatment of aluminum and aluminum alloys, an optical thermocouple having sensitivity from room temperature to about 1,200° F. is suitable.

In the illustrated embodiment, optical sensor 91 is above the support carriage 58 such that when the cool thermal shield 94b is in place, the casting 30 will be at the focal distance of of the sensor 91. The aperture of the sensor 91 will be filled by the radiant image of the casting through sensor window 93b and shielded sensor observation duct 32. The casting will have minimal reflected emitter energy contributed to the sensor. The only radiant energy emissions from the casting will be the energy driven from the casting by its true temperature.

However, the pseudo-blackbody effect created by the insertion of the cool thermal shield 94b optimizes the detectable energy emanating from the pseudo-blackbody source and masks such factors as surface roughness, color and other properties that affect the emissivity of a surface, and thus the temperature of the surface as measured by an infrared sensor. Since it is contemplated that the heat treatment of multiple castings will be controlled based upon a given thermal gradient profile, it is important that the temperature measurements taken from a given casting not be affected by variances in the emissivity of the surface of the casting. Thus, by configuring the casting 30 as a pseudo-blackbody source, variances attributable to the emissivity of the surface can be minimized, and thus a more reliable temperature measurement of the casting 30 can be obtained.

Conventional computer control systems can be used to monitor sensors 91 and also to collect the temperature data as a function of time and wavelength of the emitters. As described in more detail below, the collected data can then be used to generate a thermal gradient profile for the treated casting and also to control the subsequent heat treatments of similar castings by controlling the energy output from the respective infrared radiation emitters 84 in accordance with a control protocol described below in more detail.

The development of the Thermal Gradient Profile is outlined in the flow presented in FIG. 5 using a first article test part from a desired mold. The process begins 120 by noting the source mold and the part name or identifier for the test part or casting to be characterized. The test part is then first subjected to a surface profile measurement 122 process where the modal average peak-to-valley distances over the largest surface areas as presented to the radiant emitters are measured. The peak-to-valley distance is used to select an optimal wavelength to maximize coupling of the radiant energy presented to the test part during heating 124. The test part is heated using optimal wavelength infrared energy 126 noting any previous history with this specific mold, and a temperature vs. time map is created 128. At the nominal solutionizing temperature for the alloy under trial, the part is quenched or quenched and aged 132. The part is then subjected to a series of tests to evaluate the physical properties of the now solutionized or solutionized and aged part as a result of the process treatment 134. If the process as recorded produces the desired physical properties 138, then it will become a procedure 140 and titled the Thermal Gradient Profile for the identified part as produced from the also noted mold. If the properties are unacceptable, the noted map will be retained 126 and used as analysis data to compute a new trial process for this part and mold type. The process is then repeated using a freshly cast test part from the same mold such that the part will have the "as cast" internal structure.

Figure 6:
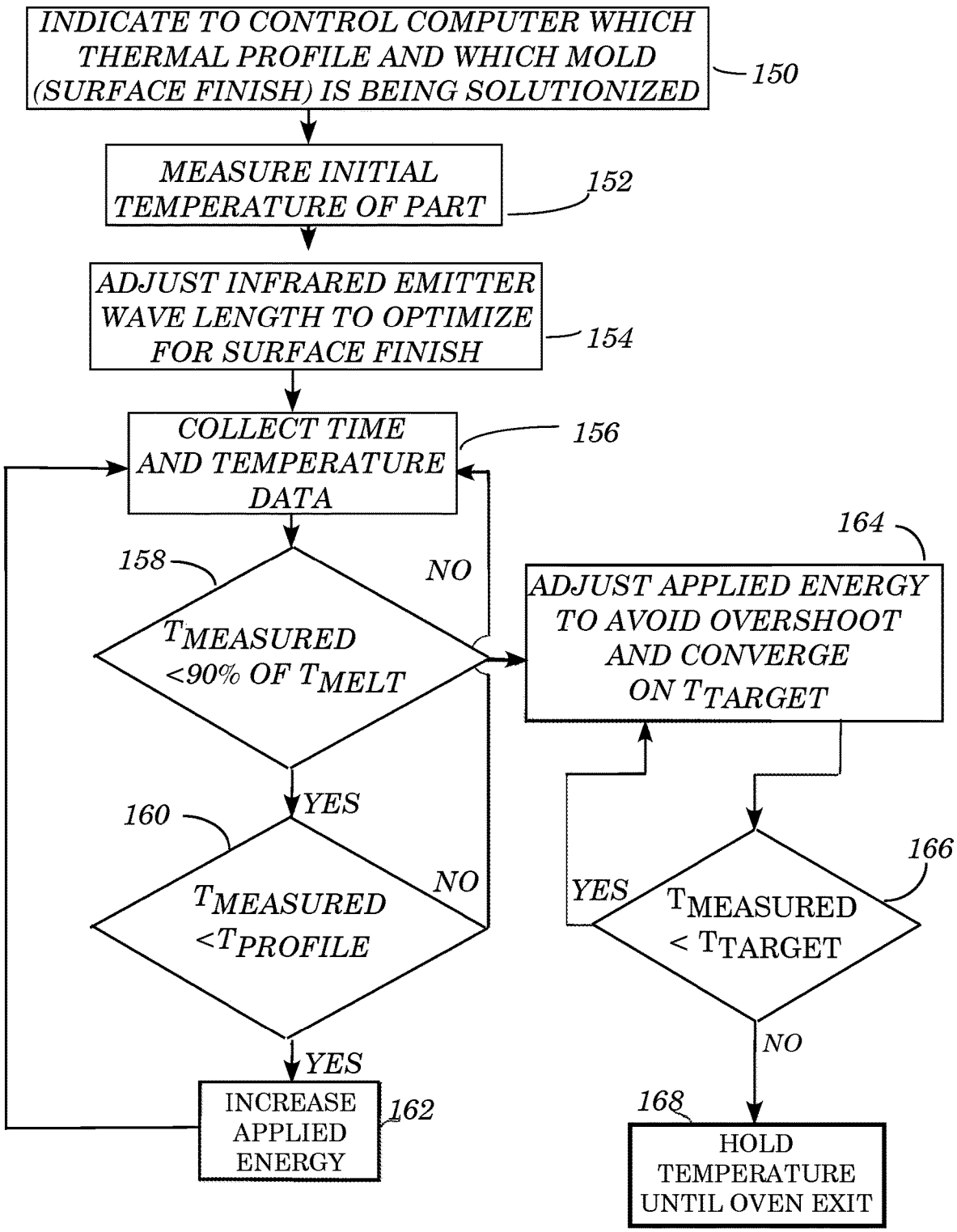
FIG. 6 is a flowchart of an embodiment of a method for controlling a heat treatment of a metal alloy carried out in accordance with the present disclosure.

Once a Thermal Gradient Profile is established for a particular test part and mold then, in accordance with this aspect of the present disclosure, an aluminum alloy casting 30 is provided at the casting loading area 80 of the radiant oven 50 described above. Referring to the flow chart in FIG. 6, after providing a part at step 150 and identifying to the computer the casting type and the mold number or name, the initial temperature of the part is measured at step 152 using the optical thermocouple 91 to observe the temperature with the cool thermal shield 94b in place providing a pseudo-blackbody source to the optical sensor 91.

After the initial temperature is measured 152, it is recorded and used to set the initial power of the optimally tuned wavelength radiant emitters. When the system is a linear, in-line (serial) process, parts do not have to wait for a "batch." Parts can be put into the oven "hot" from casting. The initial temperature measurement puts the part on the schedule for additional thermal energy. Generally, the greater the differential between the initial temperature of the casting and the target temperature, the more radiant energy (i.e., power) is applied by turning on more emitters at the selected wavelength.

Infrared energy at the optimum surface roughness transfer wavelength is applied to the outer surface of the casting at step 154. The initial power at which the infrared radiant energy is applied to the casting is preferably selected so that the thermal gradient in the casting 30 is at least 0.5° F. per second.

In order to ensure accurate temperature data and the generation of an accurate thermal gradient profile, it is preferred to sample the temperature at 15-second intervals at step 156. Active control of the intensity of infrared energy applied to the casting is achieved in step 158 by comparing the temperature measurement ($T_{MEASURED}$) with a threshold temperature set point equal to 90% of the melt temperature for the alloy ($T_{MELT}$). If $T_{MEASURED}$ is less than 90% of $T_{MELT}$, $T_{MEASURED}$ is compared to the thermal gradient profile at the particular point in time along the gradient. If $T_{MEASURED}$ is less than the thermal gradient profile temperature $T_{PROFILE}$, the control system may increase the power of the applied radiant energy at step 162. The sequence of collecting the time and temperature data then repeats itself beginning with step 156. If $T_{MEASURED}$ is not less than $T_{PROFILE}$, the intensity of the applied radiant power is not changed and steps 156 and 158 are repeated so that $T_{MEASURED}$ is measured again and compared to $T_{MELT}$. When $T_{MEASURED}$ reaches 90% of $T_{MELT}$, the control system adjusts the power of the applied radiant energy so that $T_{MEASURED}$ does not overshoot $T_{MELT}$ 164 and yet converges on the target temperature, $T_{TARGET}$. The advanced capability of the radiant emitters, enables the control system to reduce the radiant temperature of the emitters to effectively reduce the radiant energy coupling to the part to near zero as the part heats to the desired temperature.

Because of the excellent control afforded this temperature monitoring technique and the fine control of the radiant energy of the radiant emitters, $T_{TARGET}$ can be set between 97% and 98% of the melt temperature, ensuring that a solutionizing temperature is achieved. The goal in this step is to ensure that the thermal momentum of the part is not so great that the temperature of the part will rise to a point where the part melts. Thus, the goal in step 164 is to converge on $T_{TARGET}$ while ensuring that the part stays comfortably away from $T_{MELT}$.

In step 166, $T_{MEASURED}$ is compared to $T_{TARGET}$. If $T_{MEASURED}$ is less than $T_{TARGET}$, the control system adjusts the radiant power applied to the casting 30. $T_{MEASURED}$ is again measured and compared to $T_{TARGET}$ until such point that $T_{MEASURED}$ is no longer less than $T_{TARGET}$, at which time the casting temperature is held steady at step 168. While it is preferable to remove the part from the heating sequence as soon as the part reaches $T_{TARGET}$, it should be understood that the part can be maintained at $T_{TARGET}$ for a period of time if required based on the location of the part in the oven. For instance, if castings of a variable temperature are input, the computer can use the thermal gradient profile and make adjustments to maintain the steady delivery rate of the properly solutionized castings 30 to the exit of the oven system 50.

As discussed above, when $T_{MEASURED}$ is no longer less than 90% of $T_{MELT}$, the infrared power applied to the casting may be reduced so that the thermal momentum of the part does not cause the temperature of the part to exceed $T_{MELT}$ for any extended period of time. Reducing the infrared power is achieved by shutting down some of the radiant emitters 84. The goal is to slow the temperature rise rate such that it converges on $T_{TARGET}$ without overshooting. When viewing the first derivative of the thermal gradient profile, the convergent approach to $T_{TARGET}$ is indicated by the first derivative approaching zero. In this system, the accurate measure of the temperature, the measure of time, the effective tuning of the infrared emitter and modulating the number of active infrared radiant emitters allows the management of the process.

Upon the initial temperature measurement, the computer can accelerate the heating of some castings as required and idle the heating of other castings to ensure that all castings will be delivered fully processed and at the fastest possible rate. This adaptability ensures that the oven system will not become a bottleneck because one of the casting machines delivered a part late in the cycle or a casting that had missed a cycle and had time to cool significantly more than the rest of castings in process required extra time for heat treatment.

In case of a severe temperature mismatch of delivered castings, the computer has the option to pull the spring loaded exit arm 88 and allow some castings an additional trip through the oven system so that all are processed sufficiently at the overall maximum rate.

Example

The previous patent by this inventor, U.S. Pat. No. 5,981, 919 provided an example of the heat treatment of a cold or room temperature aluminum casting. The improvements in both apparatus and method disclosed in this patent enable the more beneficial capability of heat treating a casting directly from the mold while the heat of the melt can be more than 90% retained. This capability represents a reduction by a factor of more than one half of the total energy required to create a finished heat treated casting, starting with bulk foundry output aluminum which is provided as ingot or even in a liquid form.

The process of taking a still hot casting from the mold is termed "In-Line Heat Treatment." An example of the application of the method and the apparatus to a demonstration of the "In-Line Heat Treatment" component of solutionization of an example casting follows.

Figure 7:
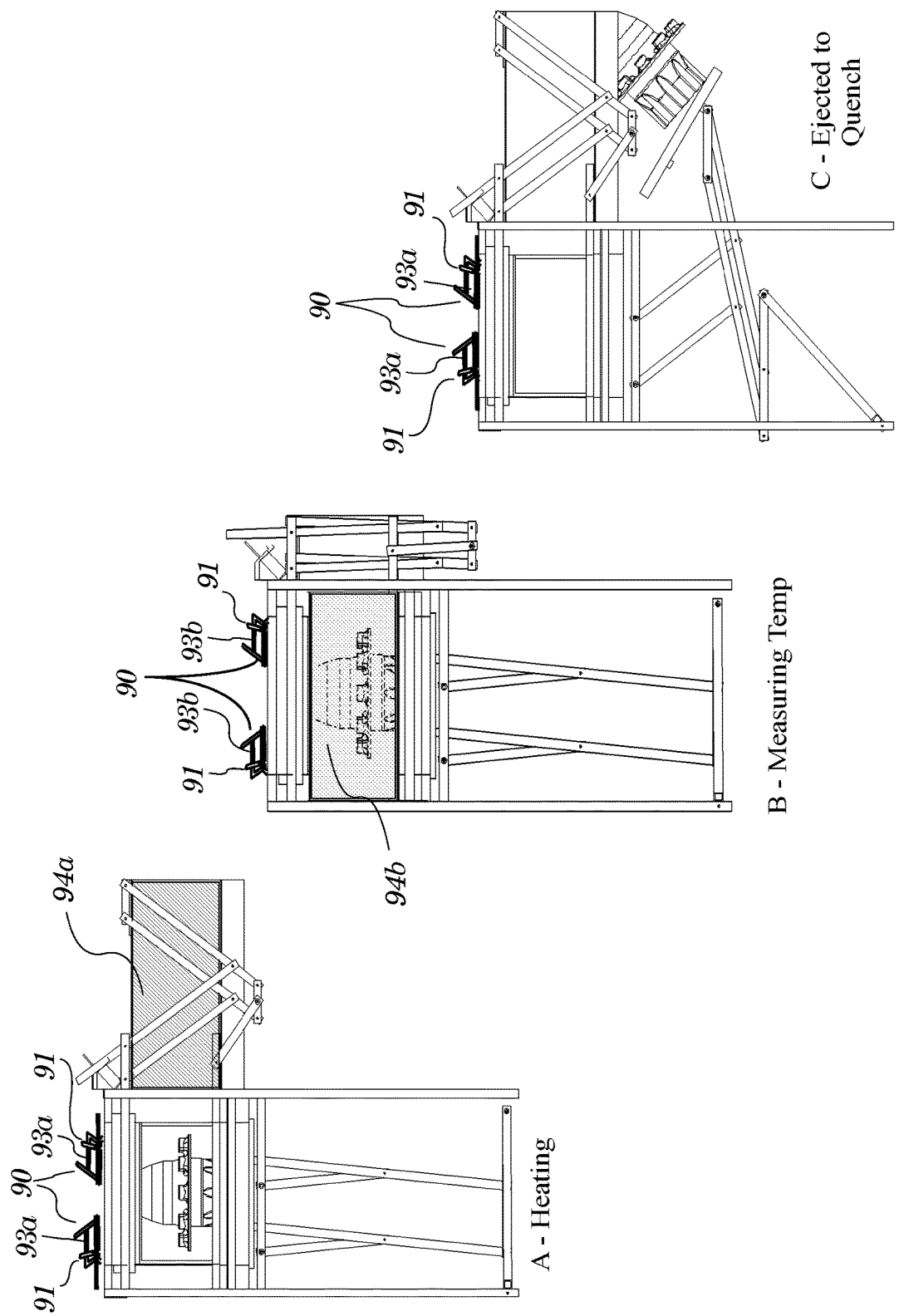
FIG. 7 shows 3 steps in a simpler embodiment (where only one casting is processed). The 3 steps show (A) the casting being heated (with shield removed); (B) the shield in place as the temperature of the casting is measured; (C) the casting being ejected when at the proper temperature to be dunked in the quench tank.

The following example depicted in FIG. 7 illustrates the advantages achieved by monitoring the temperature of an aluminum alloy part being subjected to a solution heat treatment using infrared radiant emitters in accordance with the present disclosure.

An aluminum A356 cast wheel hub similar to the one illustrated in FIG. 3.A was solution heat treated using the system described below.

An oven was constructed for the purpose of heat treating castings. The oven of discussion here is the fourth developmental oven created by this inventor over the previous near 20 years. The ovens have never been sold or put into commercial service. Yet the applied research activity has heat treated more than 3,000 commercial and industrial castings. This activity, although never for hire, has been funded by the inventor in an effort to finally come to an understanding of the operational requirements for a heat treatment oven that would meet the needs of an industrial manufacturing facility for a robust, affordable and maintainable In-Line Heat Treatment system that would deliver an improved finished casting while providing a considerable energy savings in the process when compared to the existing practices.

The furnace segment comprised 48 radiant energy sources of approximately 1.2 kW of radiant power each. These radiant emitters met the requirements as previously set out as a tunable half cylindrical Lambertian radiator with virtually no heat sink paths out of the oven. These emitters were in the shape of rectangular bricks having a width of approximately 2 inches, a length of approximately 12 inches and a height of more than 3 inches of refractory backing and side structures. The emitters were arranged so that their long axes were horizontal. A refractory-coated sheath was provided around the outside of these radiant emitters, which are capable of providing temperatures up to about 2,200° F. The radiant emitters were custom made by the inventor and are unique. These emitters were mounted in the upper half of a tetradecagon or a 14-sided polygon. The 7 surfaces that make up the top half of a somewhat cylindrical tunnel are populated with emitters such that each section presents about 48 radiant emitters driving thermal energy into the casting. The arrangement of radiant emitters is similar to FIG. 3.A and FIG. 3.B, but the oven constructed for this example is much simpler in the execution of the thermal shield.

The oven of FIG. 7 was equipped with two non-contact infrared optical thermocouples 91, each with its own thermal shield assembly 90. The one optical thermocouple was mounted toward the front of the oven directed down and rearward at about a 45° angle from the horizontal on a line parallel to the face of the emitters such that the casting would fill its field of view when the sensor heat shield was open. Thus, the front sensor was aimed to detect the temperature of the casting on the forward surface where the casting was not directly irradiated when the thermal shield is in place. The front sensor was an Exergen Model IRt/c.3X available from Exergen Corporation of Watertown, Mass.

The second non-contact infrared optical thermocouple, an Exergen Model IRt/c.10A, was mounted along the same line but facing the opposite direction behind the casting with a view of the back side of the casting which also was not irradiated when the thermal shield was in place. The second sensor 91 was also equipped with radiant shield assemblies 90 to protect the sensor window 93b from heating between measurements.

Both sensors were provided with cooling air only.

A commercial profilometer was used to measure the large surface areas of the casting to create a baseline surface roughness measure. The surface measurement modal average was measured to be about 2.5 µm for a nominal wavelength equivalent of approximately 1,652° F.

The thermal gradient profile indicated the initial heating cycle would begin by using all of the available 48 infrared heating emitters set to a radiating wavelength temperature of 1,652° F.

The previously established thermal gradient profile committed all of the radiant emitters radiating at the selected source temperature until the casting had reached 500° F. At this time, the applied power would be reduced to approximately 60% of full power by modulating the radiant emitters so that only 29 emitters would be radiating thermal energy at the 1,652° F. source temperature. The next corner of the thermal heating map is reached at 900° F., where the power would be further reduced to 30% of full power or approximately 15 emitters radiating.

Specifically for this example, as the hot casting was removed from the mold and placed in the oven the initial temperature measurement FIG. 7B with thermal shield in place 94b indicated that the casting was near 900° F. As a result the control system applied approximately 60% of full power (or 29 emitters) FIG. 7A with shield removed from the oven 94a until the next corner in the thermal gradient map at 900° F. where the power was reduced to 30% of full power by operating 15 of the infrared emitters.

Again the power was reduced to 20% of full power (or 8 emitters) at 950° F. At 1000° F., the radiant power was reduced to 10% of maximum power or 4 emitters operating and monitored closely until the measured temperature was observed to be 1110° F. at both front and rear sensors. The hub was then removed from the furnace and placed into a water bath FIG. 7C in order to quench it. The total elapsed time typical of this process was under 6 minutes.

In this disclosure, the term "Heat Treatment" includes any process for annealing, case hardening, precipitation strengthening (aging or artificial aging), tempering, solutionizing, normalizing or any other thermo-physical process (or combination of processes); the scope of this disclosure may cover any heat treatment process that applies infrared radiation using one or more of the methods and/or apparatuses of this disclosure for the purpose of altering or affecting the metals chemistry of a solid or semisolid metal, element or compound.

The invention claimed is:

1. A method of heating a metal casting using infrared energy, the method comprising:
    introducing the metal casting into a heating chamber comprising a plurality of infrared emitters directed towards the metal casting; and
    applying thermal energy to heat the metal casting to a predetermined temperature by emitting infrared radiation from at least a portion of the infrared emitters,
    wherein a wavelength of the emitted infrared radiation is selected based on a surface roughness of the metal casting to reduce radiant energy reflected by the casting and increase radiant energy absorbed by the casting.

2. The method of claim 1, further comprising:
    measuring a surface roughness value of a second metal casting cast from the same mold as the metal casting; and
    determining the wavelength of the emitted infrared radiation using the surface roughness value.

3. The method of claim 1, wherein the infrared emitters are tunable to emit different wavelengths from about 2 µm to about 3.3 µm.

4. The method of claim 1, wherein each of the infrared emitters comprises a conductive coil, and
    wherein at least 60% of the coil is embedded in a refractory material.

5. The method of claim 1, further comprising:
    moving a thermal shield from a retracted position to a deployed position to shield a temperature sensor from infrared energy from the infrared emitters;
    measuring a temperature of the part using the temperature sensor; and
    moving the thermal shield from the deployed position to the retracted position after measuring the temperature.

6. The method of claim 5, wherein the thermal shield provides a line of sight path between the metal casting and the temperature sensor, and
    wherein the thermal shield comprises a shielding part that is disposed between the infrared emitters and the metal casting in the deployed position.

7. The method of claim 1, wherein the metal casting is an aluminum alloy.

8. The method of claim 7, wherein the metal casting is an ingot, and the predetermined temperature is a melt temperature.

9. A method of heating a metal casting using infrared energy, the method comprising:
    selecting a wavelength of infrared radiation output from infrared emitters to optimize energy transfer to the metal casting based on a surface roughness of the metal casting;
    introducing the metal casting into a heating chamber comprising a plurality of infrared emitters directed towards the metal casting; and
    applying thermal energy to heat the metal casting to a predetermined temperature by emitting infrared radiation at the selected wavelength from at least a portion of the infrared emitters,
    wherein each of the infrared emitters comprises a metal coil partially embedded in a ceramic refractory material.

10. The method of claim 9, wherein each of the infrared emitters comprises a conductive coil, and
    wherein at least 60% of the coil is embedded in the ceramic refractory material.

11. The method of claim 9, wherein, for each turn of the coil, an entire surface of the coil in a first part of turn is completely covered by the ceramic refractory material, at least a portion of the surface of the coil in a second part of turn is exposed by the ceramic refractory material, and the infrared emitters are tunable to emit different wavelengths from about 2 µm to about 3.3 µm.

12. The method of claim 9, wherein selecting the wavelength comprises:
    measuring a surface roughness value of a second metal casting cast from the same mold as the metal casting; and
    selecting the wavelength of the infrared radiation using the surface roughness value.

13. The method of claim 9, further comprising:
    moving a thermal shield from a retracted position to a deployed position to shield a temperature sensor from infrared energy from the infrared emitters;
    measuring a temperature of the metal casting using the temperature sensor; and moving the thermal shield from the deployed position to the retracted position after measuring the temperature.

14. The method of claim 13, wherein the thermal shield provides a line of sight path between the metal casting and the temperature sensor, and
wherein the thermal shield comprises a shielding part that is disposed between the infrared emitters and the metal casting in the deployed position.

15. The method of claim 9, wherein the metal casting is an aluminum alloy.

16. The method of claim 15, wherein the metal casting is an ingot.

17. The method of claim 16, wherein the predetermined temperature is a melt temperature.

18. A method of heating an aluminum alloy casting using infrared energy, the method comprising:
introducing the casting into a heating chamber comprising a plurality of infrared emitters directed towards the casting, each of the infrared emitters comprising a metal coil, wherein at least 60% of the metal coil is embedded in a ceramic refractory material;
applying thermal energy to heat the casting to a predetermined temperature by emitting infrared radiation from at least a portion of the infrared emitters;
moving a thermal shield from a retracted position to a deployed position to cover the infrared emitters;
measuring a temperature of the casting using the temperature sensor; and
moving the thermal shield from the deployed position to the retracted position after measuring the temperature,
wherein a wavelength of the emitted infrared radiation is selected based on a surface roughness of the casting to reduce radiant energy reflected by the casting and increase radiant energy absorbed by the casting.

19. The method of claim 18, wherein the thermal shield provides a line of sight path between the casting and the temperature sensor, and
wherein the thermal shield comprises a shielding part that is disposed between the infrared emitters and the casting in the deployed position.

20. A method of heating a metal casting using infrared energy, the method comprising:
introducing the metal casting into a heating chamber comprising a plurality of infrared emitters directed towards the metal casting;
measuring a surface roughness value of a second metal casting cast from the same mold as the metal casting;
determining a wavelength of the infrared energy using the surface roughness value; and
applying thermal energy to heat the metal casting to a predetermined temperature by emitting infrared radiation at the determined wavelength from at least a portion of the infrared emitters.

* * * * *